(12) United States Patent
Chen

(10) Patent No.: US 8,793,149 B2
(45) Date of Patent: *Jul. 29, 2014

(54) META DATA MODEL FOR MANAGING WORK PRODUCTS AND DELIVERABLES

(71) Applicant: International Business Machines Corporation, Armonk, NY (US)

(72) Inventor: Jane Chen, Malvern East (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/918,114

(22) Filed: Jun. 14, 2013

(65) Prior Publication Data

US 2013/0282416 A1    Oct. 24, 2013

Related U.S. Application Data

(63) Continuation of application No. 12/571,522, filed on Oct. 1, 2009, now Pat. No. 8,478,615.

(51) Int. Cl.
*G06Q 10/00* (2012.01)

(52) U.S. Cl.
USPC ...................................... 705/7; 705/8; 705/9

(58) Field of Classification Search
USPC ...................................... 705/7, 8, 9
See application file for complete search history.

(56) References Cited

U.S. PATENT DOCUMENTS

| | | | |
|---|---|---|---|
| 8,190,465 B2 | 5/2012 | Lokowandt et al. | |
| 8,478,615 B2 * | 7/2013 | Chen | 705/7.11 |
| 8,549,036 B2 | 10/2013 | O'Connor et al. | |
| 2002/0188485 A1 | 12/2002 | Benny et al. | |
| 2005/0137920 A1 | 6/2005 | O'Connor et al. | |
| 2007/0288275 A1 | 12/2007 | Kumar | |
| 2008/0127047 A1 | 5/2008 | Zhang et al. | |
| 2008/0215397 A1 | 9/2008 | Bhattacharya et al. | |
| 2008/0312980 A1 | 12/2008 | Boulineau et al. | |
| 2009/0248463 A1 | 10/2009 | Piochon et al. | |
| 2009/0254876 A1 | 10/2009 | Kuriakose et al. | |
| 2009/0254877 A1 | 10/2009 | Kuriakose et al. | |
| 2011/0082715 A1 | 4/2011 | Chen | |
| 2012/0331442 A1 | 12/2012 | Chen | |

OTHER PUBLICATIONS

Bertrand Portier; SOA terminology overview, Part 2: Development processes, models and assets; Apr. 5, 2007; 10 pages; http://www.ibm.com/developerworks/webservices/library/ws-soa-term2/; retrieved from the Internet Apr. 10, 2008.

(Continued)

*Primary Examiner* — Nga B. Nguyen
(74) *Attorney, Agent, or Firm* — Schmeiser, Olsen & Watts; John Pivnichny

(57) ABSTRACT

A method and program product for managing work products by utilizing a data model that provides traceability between business requirements and implemented services. The data model includes functional requirement, process element, business service, service design and service component asset types, and the relationships between the asset types. The asset types and the relationships provide a tracing between the functional requirement and the implemented service. In one embodiment, the tracing includes generating a series of displays in response to hyperlink selections. The series of displays include details of related instances of the functional requirement, process element, business service, service design, and service component asset types.

18 Claims, 18 Drawing Sheets

(56) References Cited

OTHER PUBLICATIONS

Beydoun et al.; Developing and Evaluating a Generic Metamodel for MAS Work Products; pp. 126-142; School of Information Systems, Technology and Management, University of New South Wales, Sydney, Australia; 2006.
Notice of Allowance (Mail Date Feb. 28, 2013) for U.S. Appl. No. 12/571,522, filed Oct. 1, 2009.
Notice of Allowance (Mail Date Jan. 24, 2013) for U.S. Appl. No. 12/571,522, filed Oct. 1, 2009.
Response filed in Response Ex Parte Quayle Action (Mail Date Sep. 4, 2012) for U.S. Appl. No. 12/571,522, filed Oct. 1, 2009.
Ex Parte Quayle Action (Mail Date Sep. 4, 2012) for U.S. Appl. No. 12/571,522, filed Oct. 1, 2009.
U.S. Appl. No. 13/604,778, filed Sep. 6, 2012.
Notice of Allowance (Mail Date Feb. 19, 2014) for U.S. Appl. No. 13/604,778, filed Sep. 6, 2012.

* cited by examiner

700

```
Asset: Functional Requirement FR1
...
Description
...
Categories
...
Related Assets
    Process Element PE1
...
```

```
Asset: Process Element PE1
...
Description
...
Categories
...
Related Assets
    Business Service BS1
    Functional Requirements of Process P1
...
```

```
Asset: Business Service BS1
...
Description
...
Categories
    Consumer
        Customer 1
        Customer 2
        Customer 3
        Supplier/Partner 1
        Supplier/Partner 2
        Application 1
        ...
    Provider
    ...
Related Assets
    Process Element PE1
    Entity E1
    IT Service Design SD1
    Standard S1
    Standard S2
...
```

```
Asset: Entity E1
…
Description
…
Categories
…
Related Assets
    Business Service BS1
…
```

```
Asset: IT Service Design SD1
…
Description
…
Categories
    SOA Service Design
    …
Related Assets
    Business Service BS1
    Service Component SC1
    Standard S3
…
```

```
Asset: Service Component SC1
...
Description
...
Categories
...
Related Assets
    IT Service Design SD1
...
```

```
Asset: Service Component SC1

Work Product Instances
Asset 1
...
Asset N
```

FIG. 12B

META DATA MODEL FOR MANAGING WORK PRODUCTS AND DELIVERABLES

This application is a continuation application claiming priority to Ser. No. 12/571,522, filed Oct. 1, 2009, now U.S. Pat. No. 8,478,615, issued Jul. 2, 2013.

FIELD OF THE INVENTION

The present invention relates to a data processing method and system that defines and utilizes a meta data model representing work products and deliverables, and more particularly to a meta data model that provides traceability of business requirements to implemented services.

BACKGROUND OF THE INVENTION

Conventional techniques for managing work products and deliverables focus on individual business requirements and the corresponding information technology (IT) that supports the business requirements without providing an overall business architecture context. Such conventional techniques result in inefficient duplicated services, thereby failing to facilitate reusability of service-oriented architecture (SOA) solutions. Furthermore, the known techniques for managing work products and deliverables are deficient in identifying valuable types of SOA solution capabilities. Thus, there exists a need to overcome at least one of the preceding deficiencies and limitations of the related art.

SUMMARY OF THE INVENTION

In first embodiments, the present invention provides a computer program product comprising a computer readable storage medium. A computer readable program code is stored in the computer readable storage medium. The computer readable program code contains instructions executable by a processor of a computer system to implement a method of tracing a business requirement to an implemented service in a systems development lifecycle by processing data conforming to a data model. The data model comprises:

a first asset type (functional requirement type) that represents a functional requirement;

a second asset type (process element type) that represents a process element;

a third asset type (business service type) that represents a business service;

a fourth asset type (standard type) that represents a standard;

a fifth asset type (service design type) that represents an information technology (IT) service design;

a sixth asset type (service component type) that represents a service component of the business service;

a first relationship between the functional requirement type and the process element type, wherein the first relationship specifies that the functional requirement is represented as the process element;

a second relationship between the process element type and the business service type, wherein the second relationship specifies that the process element identifies the business service;

a third relationship between the business service type and the standard type, wherein the third relationship specifies that the business service conforms to the standard;

a fourth relationship between the business service type and the service design type, wherein the fourth relationship specifies that the business service is designed as the IT service design;

a fifth relationship between the standard type and the service design type, wherein the fifth relationship specifies that the standard is a design template for the IT service design; and a sixth relationship between the service design type and the service component type, wherein the sixth relationship specifies that the service design provides design guidelines for the service component, wherein the service component realizes a service interface represented by a service interface type, wherein the service interface specifies the implemented service represented by a service implementation type, wherein the functional requirement type, the process element type, the business service type, the service design type, the service component type, the first relationship, the second relationship, the fourth relationship, and the sixth relationship provide a tracing between the functional requirement and the implemented service, and wherein the first asset type, the second asset type, the third asset type, the fourth asset type, the fifth asset type, and the sixth asset type are heterogeneous asset types.

In second embodiments, the present invention provides a computer-implemented method of managing a work product in a systems development lifecycle. The method comprises:

storing an instance of a data model in a computer readable storage medium; and a computer system tracing a functional requirement to an implemented service, wherein the tracing includes:

displaying a first display of details of the functional requirement, wherein the first display includes a first hyperlink;

receiving a first selection of the first hyperlink subsequent to displaying the first display;

responsive to receiving the first selection, displaying a second display of details of a process element related to the functional requirement by the data model, wherein the second display includes a second hyperlink;

receiving a second selection of the second hyperlink subsequent to displaying the second display;

responsive to receiving the second selection, displaying a third display of details of a business service related to the process element by the data model, wherein the third display includes a third hyperlink;

receiving a third selection of the third hyperlink subsequent to displaying the third display;

responsive to receiving the third selection, displaying a fourth display of details of an information technology (IT) service design related to the business service by the data model, wherein the fourth display includes a fourth hyperlink;

receiving a fourth selection of the fourth hyperlink subsequent to displaying the fourth display;

responsive to receiving the fourth selection, displaying a fifth display of details of a service component of the business service, wherein the service component is related to the IT service design by the data model, and wherein a fifth hyperlink is displayed via the fifth display;

receiving a fifth selection of the fifth hyperlink subsequent to displaying the fifth display; and responsive to receiving the fifth selection, displaying a document of one or more documents that support the implemented service, wherein the first display, the second display, the third display, the fourth display, and the fifth display are heterogeneous displays, and wherein the first hyperlink, the second hyperlink, the third hyperlink, the fourth hyperlink, and the fifth hyperlink are heterogeneous hyperlinks.

A process for supporting computing infrastructure corresponding to the above-summarized method is also described and claimed herein.

The present invention provides a program product and method for managing work products by utilizing a meta data model that provides traceability between requirements and implemented services. Relationships (e.g., dependencies) between work products are enforced by the meta data model so that any missing work products along the development lifecycle are easily identified. The meta data model also captures reuse of services by highlighting which consumers are calling on the service. Furthermore, the meta data model highlights the multiple capabilities that can be leveraged to fulfill an outcome.

BRIEF DESCRIPTION OF THE DRAWINGS

FIG. 7 depicts a display of details of a functional requirement of an asset type included in the meta data model portion of FIG. 2, in accordance with embodiments of the present invention.

FIG. 8 depicts a display of details of a process element of an asset type included in the meta data model portion of FIG. 3B, in accordance with embodiments of the present invention.

FIG. 9 depicts a display of details of a business service of an asset type included in the meta data model portion of FIG. 4B, in accordance with embodiments of the present invention.

FIG. 10 depicts a display of details of an entity of an asset type included in the meta data model portion of FIG. 3B, in accordance with embodiments of the present invention.

FIG. 11 depicts a display of details of an IT service design of an asset type included in the meta data model portion of FIG. 5, in accordance with embodiments of the present invention.

FIG. 12A depicts a display of details of a service component of an asset type included in the meta data model portion of FIG. 6B, in accordance with embodiments of the present invention.

FIG. 12B depicts a display of content that implements the service component of FIG. 12A, in accordance with embodiments of the present invention.

DETAILED DESCRIPTION OF THE INVENTION

Overview

Figure 1:
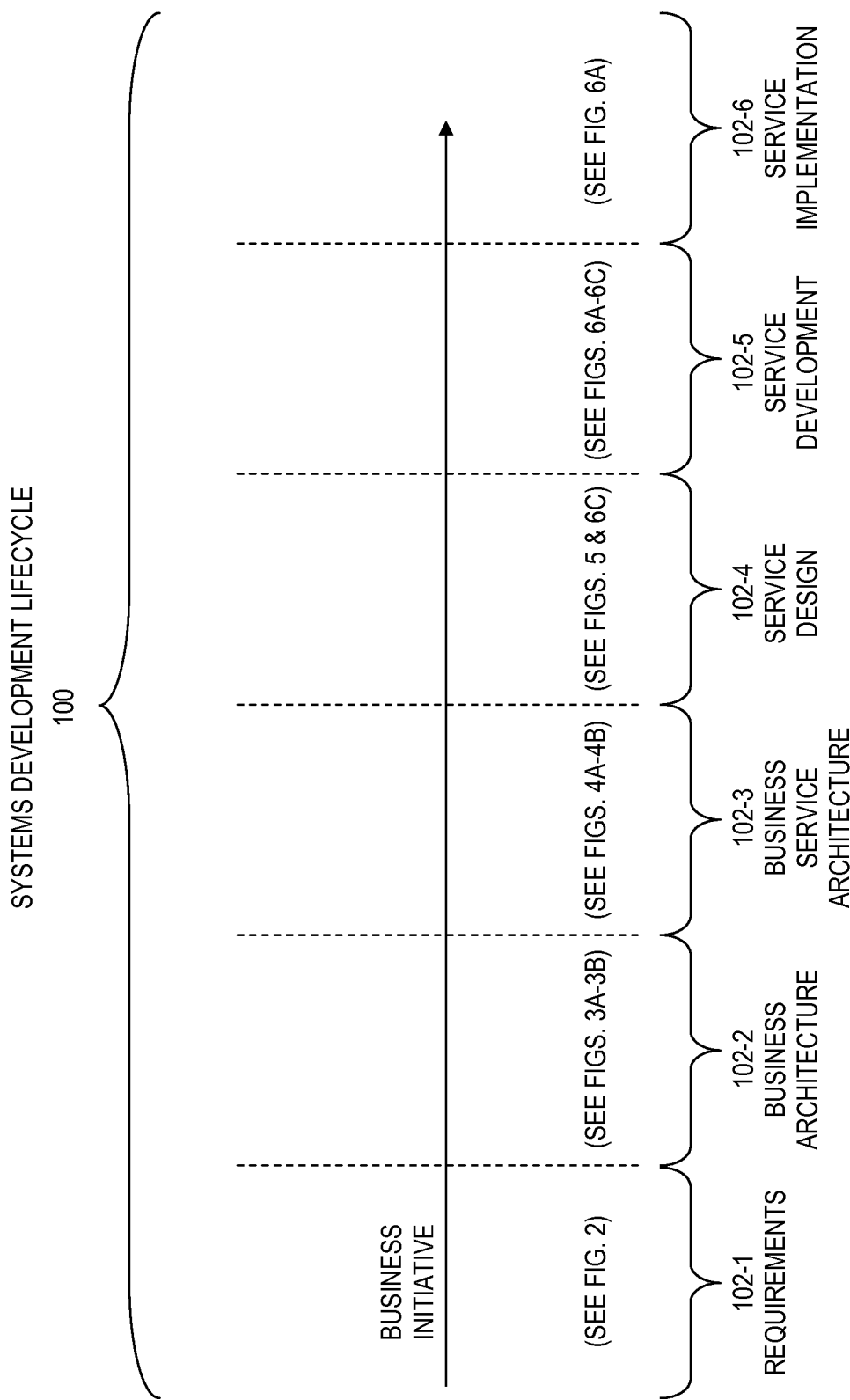
FIG. 1 is a diagram of a systems development lifecycle, in accordance with embodiments of the present invention.

One or more embodiments of the present invention provide a data model that represents meta data of work products (a.k.a. assets) and deliverables that are developed as a business initiative progresses along a systems development lifecycle. The data model also represents relationships between assets, where the relationships provide traceability of a business requirement to an implemented service. Furthermore, the data model indicates information of interest (e.g., asset type, artifact, and common attributes), as well as the role of each item of the information in the systems development lifecycle. Moreover, a software application that utilizes the data model facilitates reuse of services by highlighting multiple consumers that are calling for the provision of a service. A software application using the data model may also highlight the multiple capabilities that can be leveraged to fulfill a business outcome. Hereinafter, the data model for managing work products and deliverables and providing traceability between business requirements and implemented services is also simply referred to as "the data model" or "the meta data model."

Definitions

API (Asset Type): asset type that specifies an application programming interface.

Application (Category Schema): a category schema that specifies a system with a set of functional and data support packaged to provide an automated system to support a business need.

Artifact (a.k.a. artefact): a specification of a physical piece of information that is used or produced in a systems development lifecycle or by deployment and operation of a system.

Examples of artifacts include model files, source files, scripts, binary executable files, tables in a database system, development deliverables, word processing document, and mail messages.

Asset: a resource (e.g., artifact) that has value to an organization.

Asset Type: a categorization of assets that facilitates the interpretation of the asset.

Business Architecture (see FIG. 1): phase of a systems development lifecycle that captures the business model, including business process and business data, that supports the business.

Business Initiative: a program designed to implement a strategic or tactical business objective.

Business Outcome: the result that is achieved from a business initiative.

Business Process (Category Schema): the set of activities that are performed to achieve a desired outcome.

Business Process Model: a model of a set of activities designed to achieve a desired outcome.

Business Requirement: a requirement that describes in business terms what must be delivered or accomplished to provide value.

Business Service (Asset Type): asset type that represents related business activities and supporting data, where the business activities are performed to deliver business outcomes. A business service may satisfy a business outcome in an SOA environment. A business service is described in a Service Profile that documents purpose, scope, triggers and outcomes to enable solution teams to understand the business intent of the business service.

Business Service Architecture (see FIG. 1): phase of a systems development lifecycle in which the business services are defined including detail of dependencies and role of each service such as Consumer or Producer.

Capability: a functional requirement.

Common Attribute: an item of data that is common across the organization.

Consumer (Category Schema): a category schema that specifies the asset that consumes a service. A consumer specified by a consumer category schema may be a person or a computer system.

Customer (Category Schema): a category schema that specifies the primary stakeholder for which the system (computer or other) is being developed.

Data Requirement (Asset Type): asset type that specifies the data that is required by an organization to manage the business.

Deliverable: a specialized type of work product used to define the primary outputs that represent value, material or otherwise, to the client, customer or other stakeholders. Deliverables are typically the result of packaging other work products for sign-off and delivery.

Entity (Object) (Asset Type): asset type that describes the data that is processed by a business service to deliver a business outcome.

Functional Requirement (Asset Type): asset type that specifies a necessary function, result or capability of a delivered information technology system or of a component thereof Functional requirements are also known as capabilities. A function specified by a functional requirement is a set of inputs, behavior, and outputs. Functional requirements may be calculations, technical details, data manipulation and processing and other specific functionality that define what a system is supposed to accomplish.

Generic Process (Category Schema): a common set of business activities that applies across a number of business scenarios that enables a common application of business process implementation.

Heritage (Category Schema): a classification of a system that is deemed to have strategic importance to an organization and that is also considered 'legacy'.

Human Service Design (Asset Type): asset type that specifies the aspects of a solution that is being implemented using human technology.

IT Service Design (Asset Type): asset type that specifies the aspects of a solution that is being implemented using computer technology.

Legacy (Category Schema): a classification of a system that is deemed to have minimal strategic relevance to an organization, and that will be considered for strategic replacement.

Non-functional Requirement (Asset Type): asset type that specifies criteria for judging the operation of an information technology system (i.e., how well the system performs its functions), rather than specific behaviors of the system. Non-functional requirements are also known as quality requirements, qualities, quality attributes, quality goals, constraints, performance requirements or quality of service requirements. Examples of non-functional requirements include requirements that specify usability, availability, reliability, supportability, testability, maintainability, scalability, extensibility, look-and-feel, performance, or ease-of-use of a system.

Package (Category Schema): a set of solution components bundled to form a software product.

Process (Asset Type): asset type that represents either (1) a generic process that is used to identify generic business services or (2) an end-to-end process in operation.

Process Element (Asset Type): asset type that represents a business requirement and is used as input to identifying and defining business services.

Provider (Category Schema): a category schema that specifies the asset that provides or exposes a service. A provider specified by a provider category schema may be a person or a computer system.

P2P Service Design (Category Schema): a category schema that specifies point-to-point (P2P) interfacing between two or more software components.

Requirement: a statement that identifies a necessary attribute, capability, characteristic, or quality of an information technology system in order for the system to have value and utility to a user.

Requirements (see FIG. 1): phase of a systems development lifecycle in which an organization's business needs are specified.

Service: a solution component that is designed to satisfy a business process element (or activity) with associated data in a business process.

(Service) Component (Asset Type): asset type that specifies a reusable object or program that performs a specific function, is designed to work with other components and applications, and that is designed to implement an activity using computer technology.

Service Component Test (Asset Type): asset type that specifies the test required to ensure the service component fulfills the business requirements.

Service Design (see FIG. 1): phase of a systems development lifecycle in which the business service architecture is designed.

Service Development (see FIG. 1): phase of a systems development lifecycle in which components of the service design are developed.

Service Implementation (see FIG. 1): phase of a systems development lifecycle in which a service is implemented.

Service Implementation (Asset Type): asset type that specifies how the service is being implemented.

Service Interface (Asset Type): asset type that specifies how the interface is being implemented for the service.

SOA Service Design (Category Schema): describes the implementation design for an IT service.

SOA Solution: describes the IT Architectural style in which a solution is being designed and implemented.

Standard (Asset Type): Assets related to design standards governing Service Design Assets.

Supplier (Category Schema): a category schema that specifies the asset that can be described as a Supplier of goods and/or services or an entity allied with the Customer based on a partnering arrangement that facilitates a sustainable competitive advantage.

Systems Development Lifecycle (a.k.a. software development lifecycle): any logical process used by a systems analyst to develop or alter an information technology system.

Test Case (Asset Type): asset type that specifies the test scenarios that validate that the business requirements are being met.

Test Data (Asset Type): asset type that specifies the test data that is used to validate the implemented solution.

Work Product: defines and describes the items needed as input or created as output of one or more tasks that are the responsibility of a single role.

Data Model for Managing Work Products and Deliverables

FIG. 1 is a diagram of a systems development lifecycle, in accordance with embodiments of the present invention. A systems development lifecycle 100 includes the following phases through which a business initiative progresses: requirements 102-1, business architecture 102-2, business service architecture 102-3, service design 102-4, service development 102-5 and service implementation 102-6.

FIG. 2, FIGS. 3A-3B, FIGS. 4A-4B, FIG. 5, and FIGS. 6A-6C collectively depict a meta data model for managing work products and deliverables that are used in the systems development lifecycle 100 (see FIG. 1). The meta data model is depicted in FIG. 2, FIGS. 3A-3B, FIGS. 4A-4B, FIG. 5, and FIGS. 6A-6C as a Unified Modeling Language (UML) class diagram.

Figure 2:
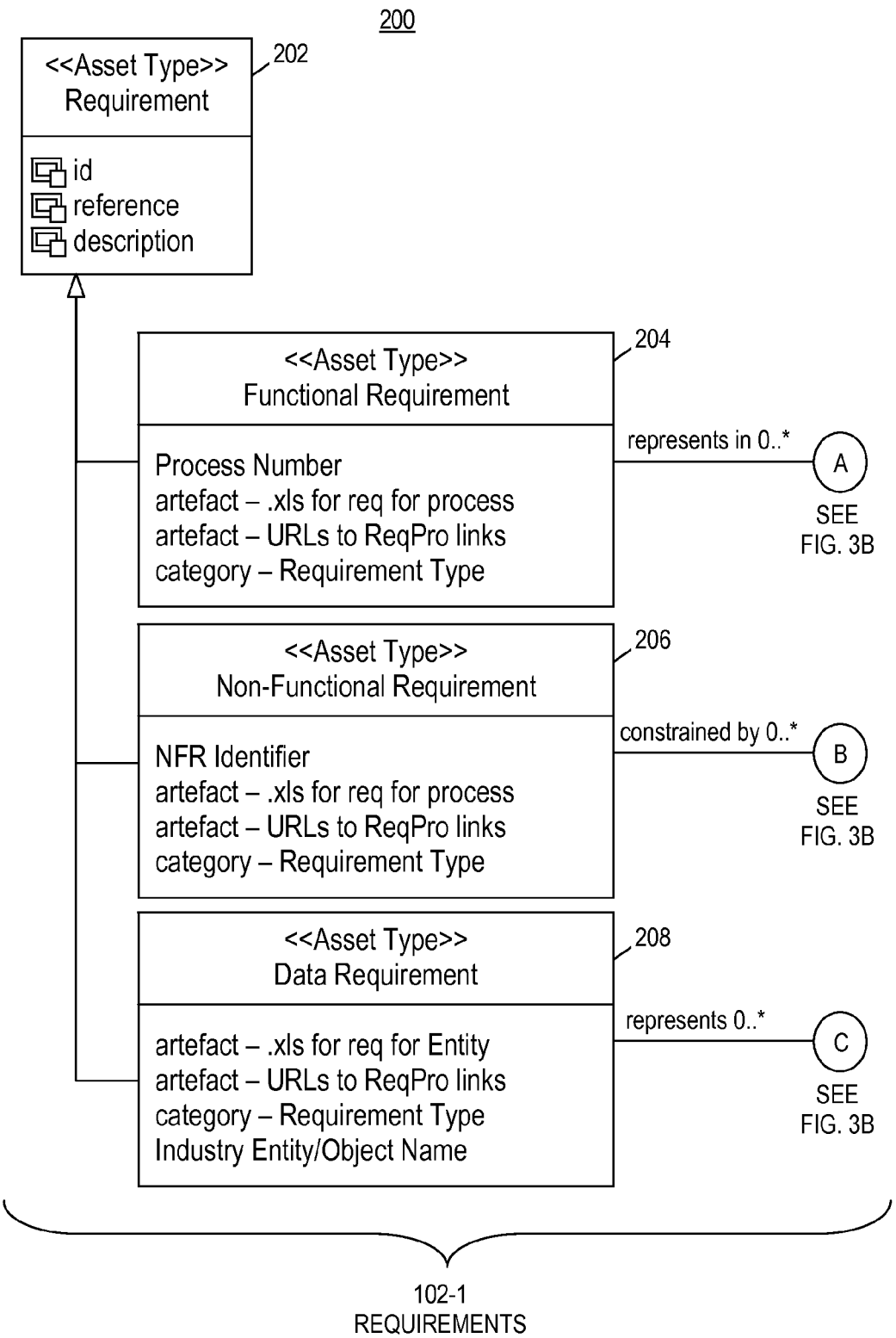
FIG. 2 is a block diagram of a portion of a meta data model for managing work products and deliverables and providing traceability between business requirements and implemented services, where the portion represents work products in a requirements period of the systems development lifecycle of FIG. 1, in accordance with embodiments of the present invention.
Figure 3A:
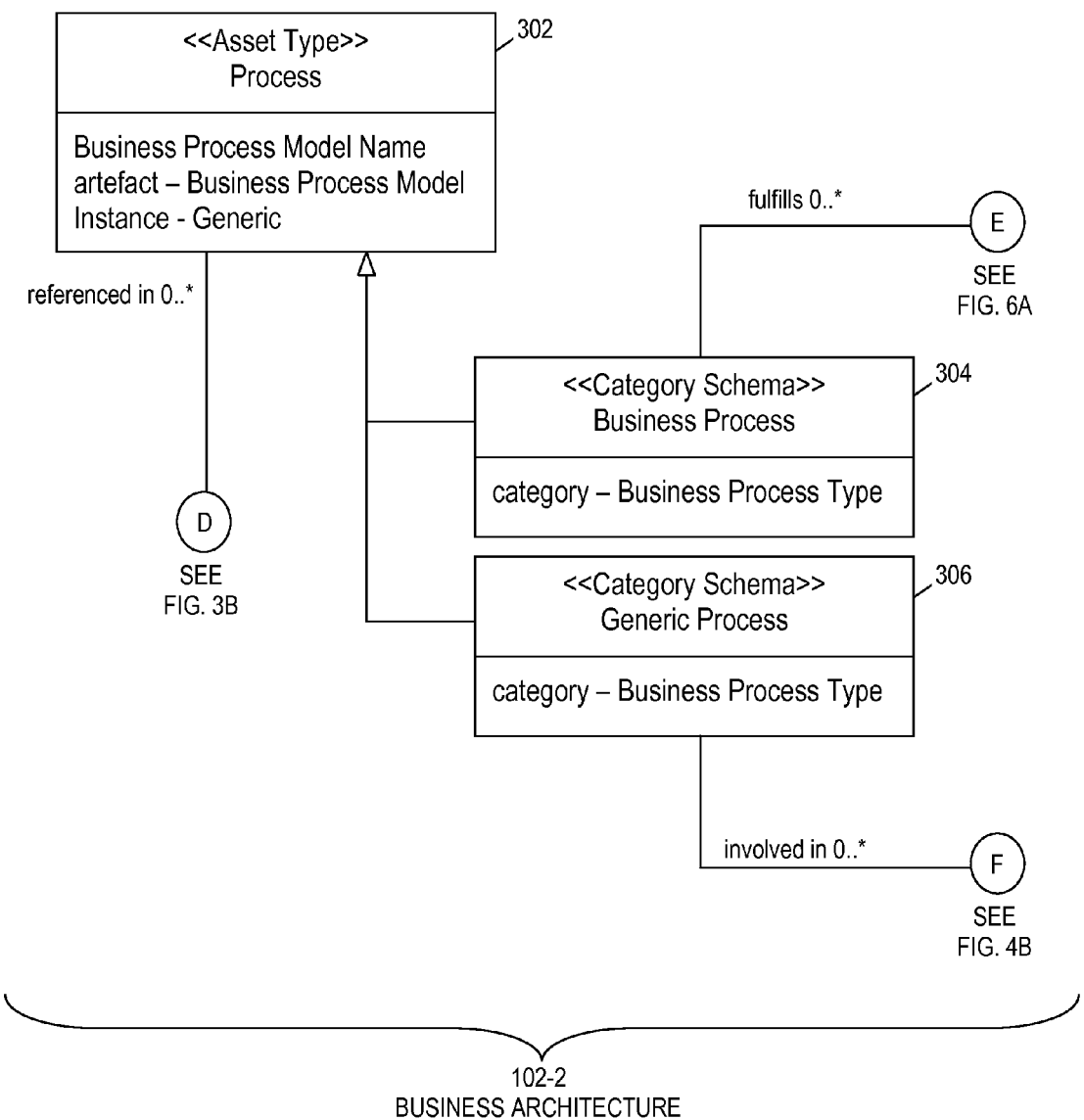
FIGS. 3A-3B is a block diagram of portions of a meta data model for managing work products and deliverables and providing traceability between business requirements and implemented services, where the portions represent work products in a business architecture period of the systems development lifecycle of FIG. 1, in accordance with embodiments of the present invention.
Figure 3B:
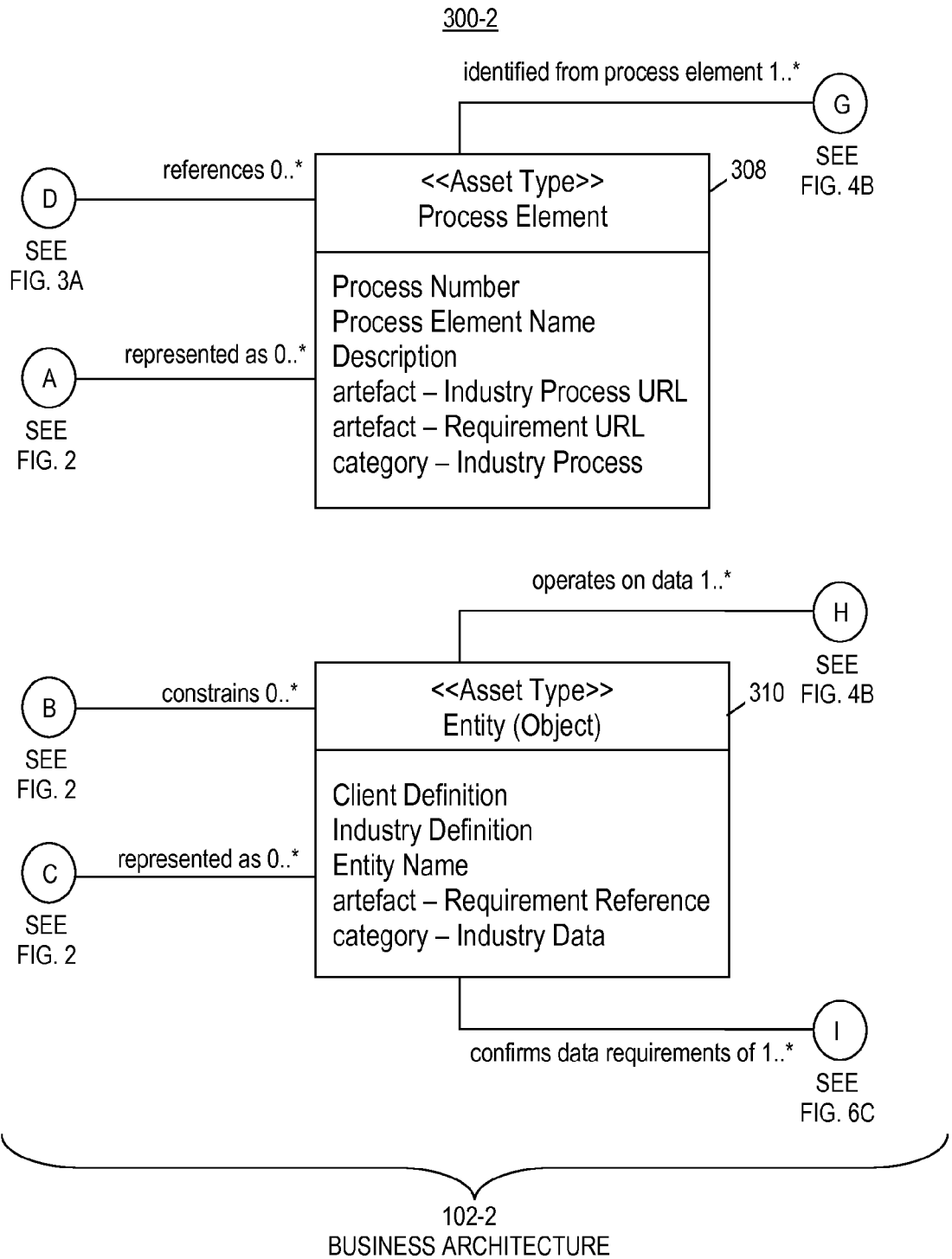
Figure 4A:
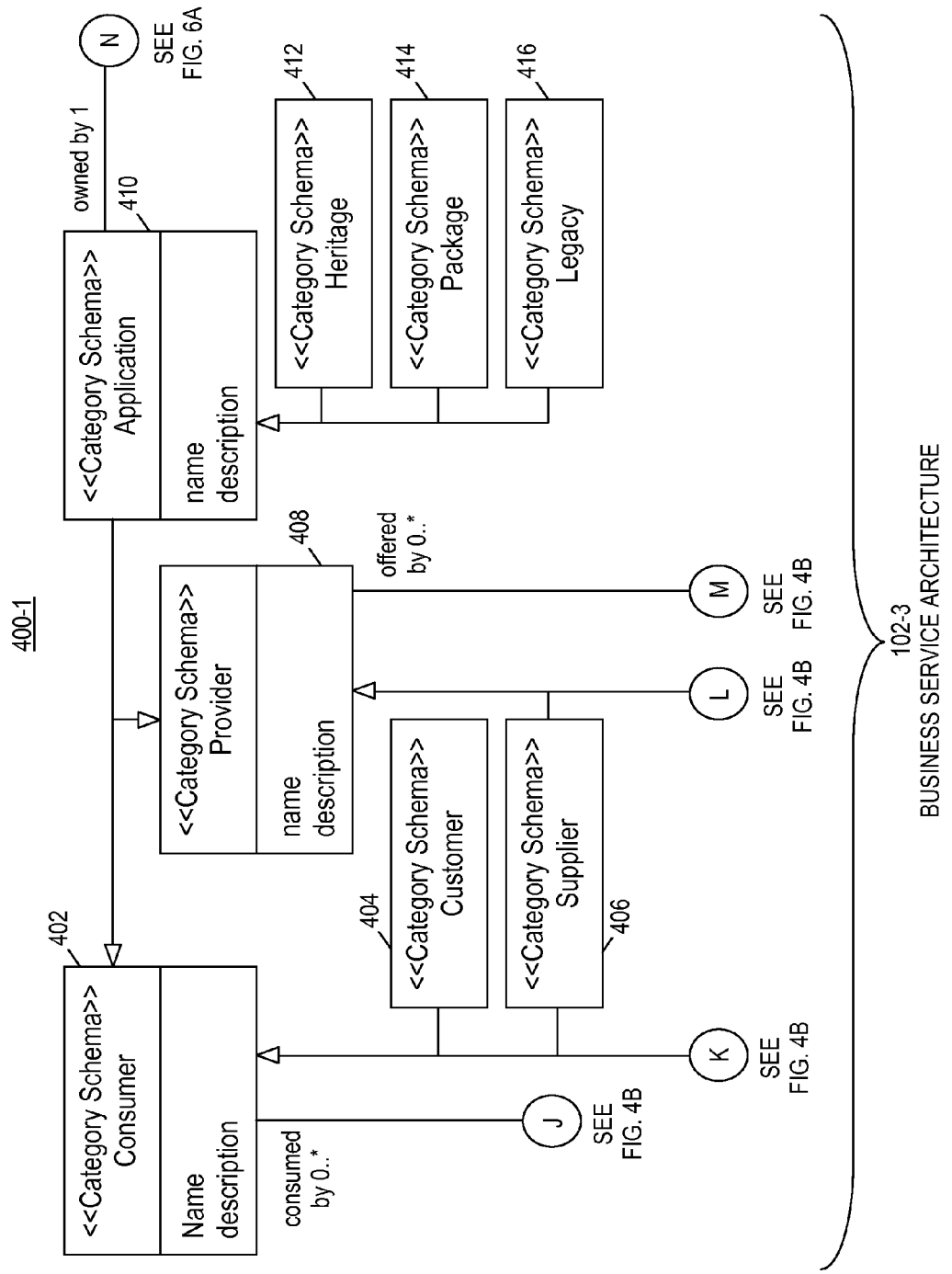
FIGS. 4A-4B is a block diagram of portions of a meta data model for managing work products and deliverables and providing traceability between business requirements and implemented services, where the portions represent work products in a business service architecture period of the systems development lifecycle of FIG. 1, in accordance with embodiments of the present invention.
Figure 4B:
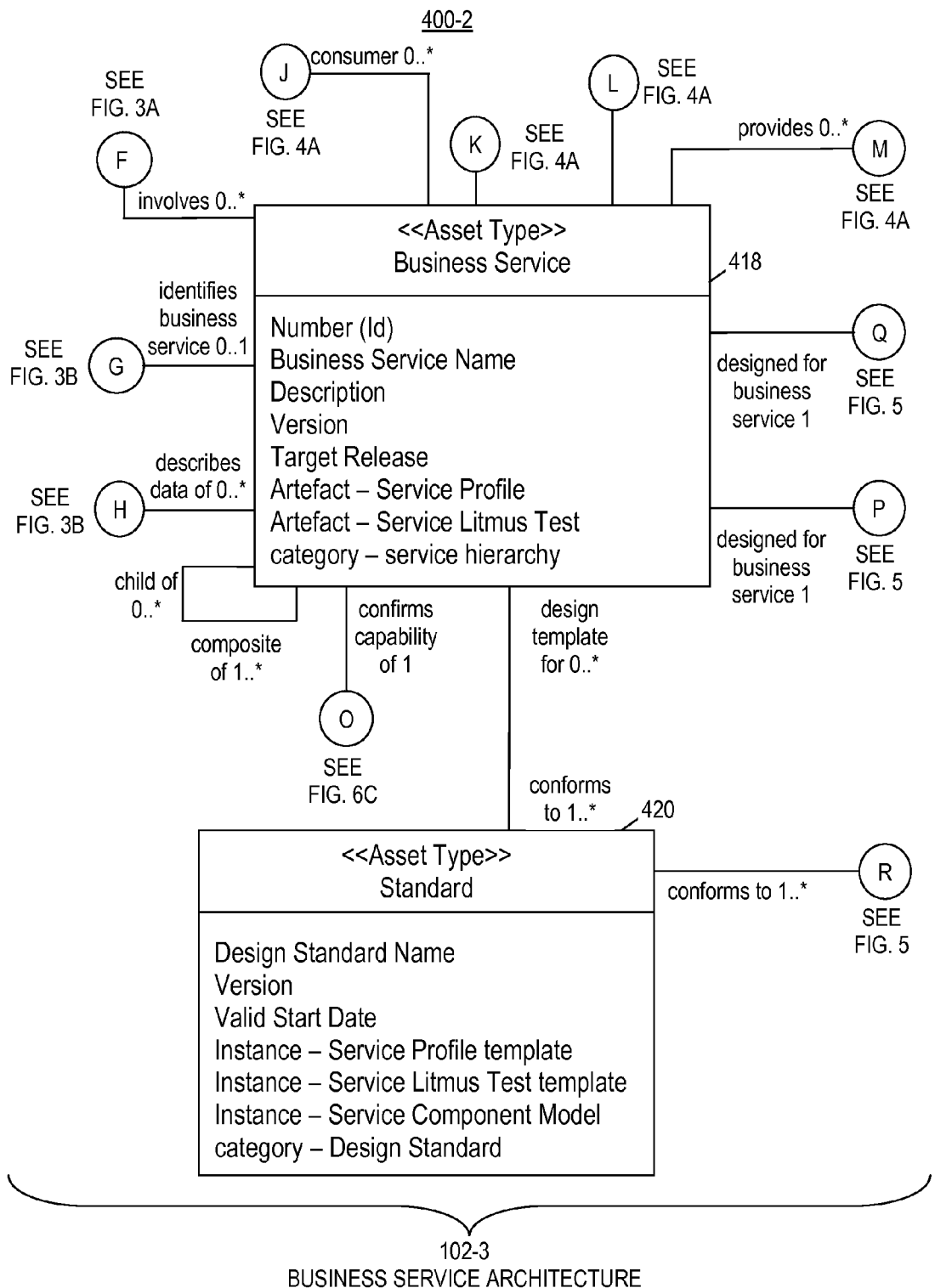
Figure 5:
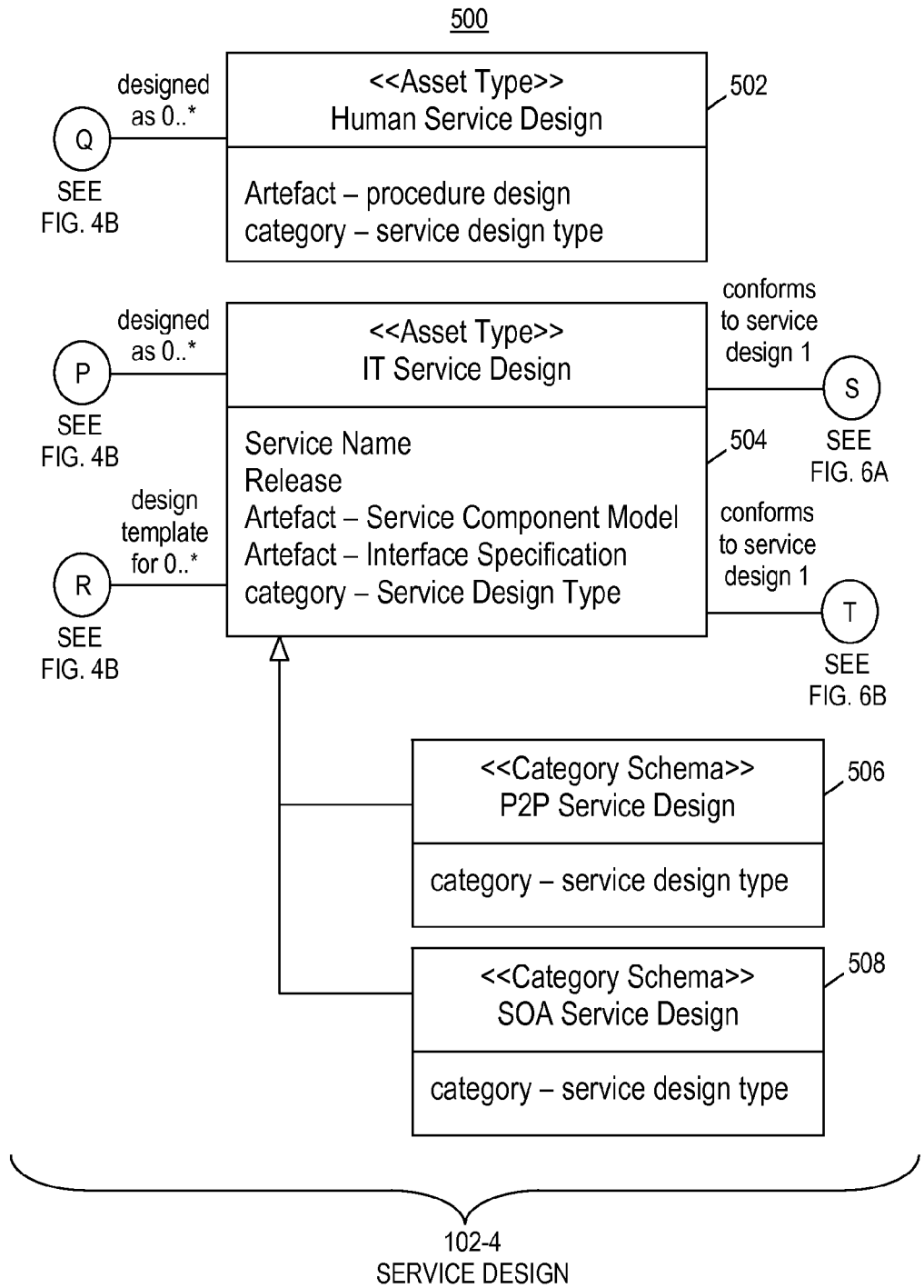
FIG. 5 is a block diagram of a portion of a meta data model for managing work products and deliverables and providing traceability between business requirements and implemented services, where the portion represents work products in a service design period of the systems development lifecycle of FIG. 1, in accordance with embodiments of the present invention.
Figure 6A:
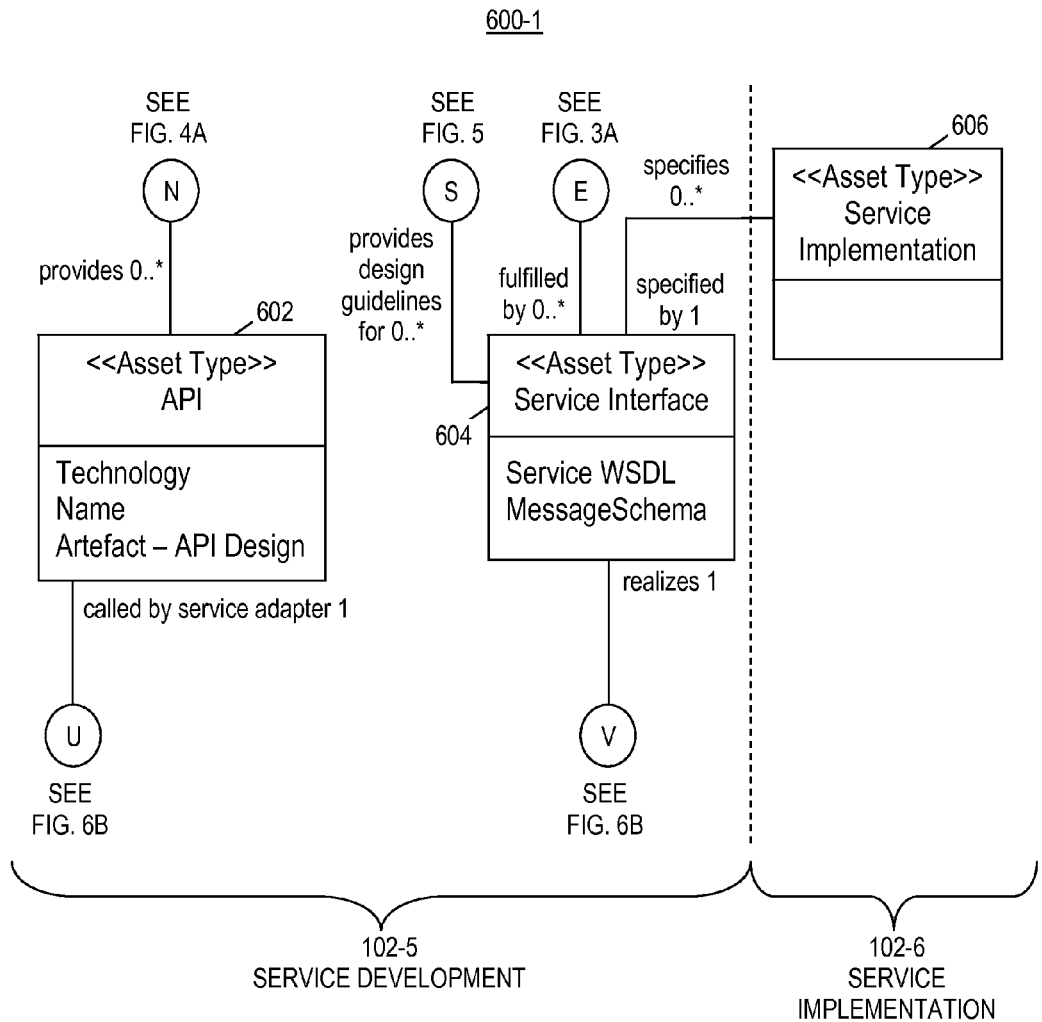
FIGS. 6A-6C is a block diagram of portions of a meta data model for managing work products and deliverables and providing traceability between business requirements and implemented services, where the portions represent work products in a service design period, a service development period, and a service implementation period of the systems development lifecycle of FIG. 1, in accordance with embodiments of the present invention.
Figure 6B:
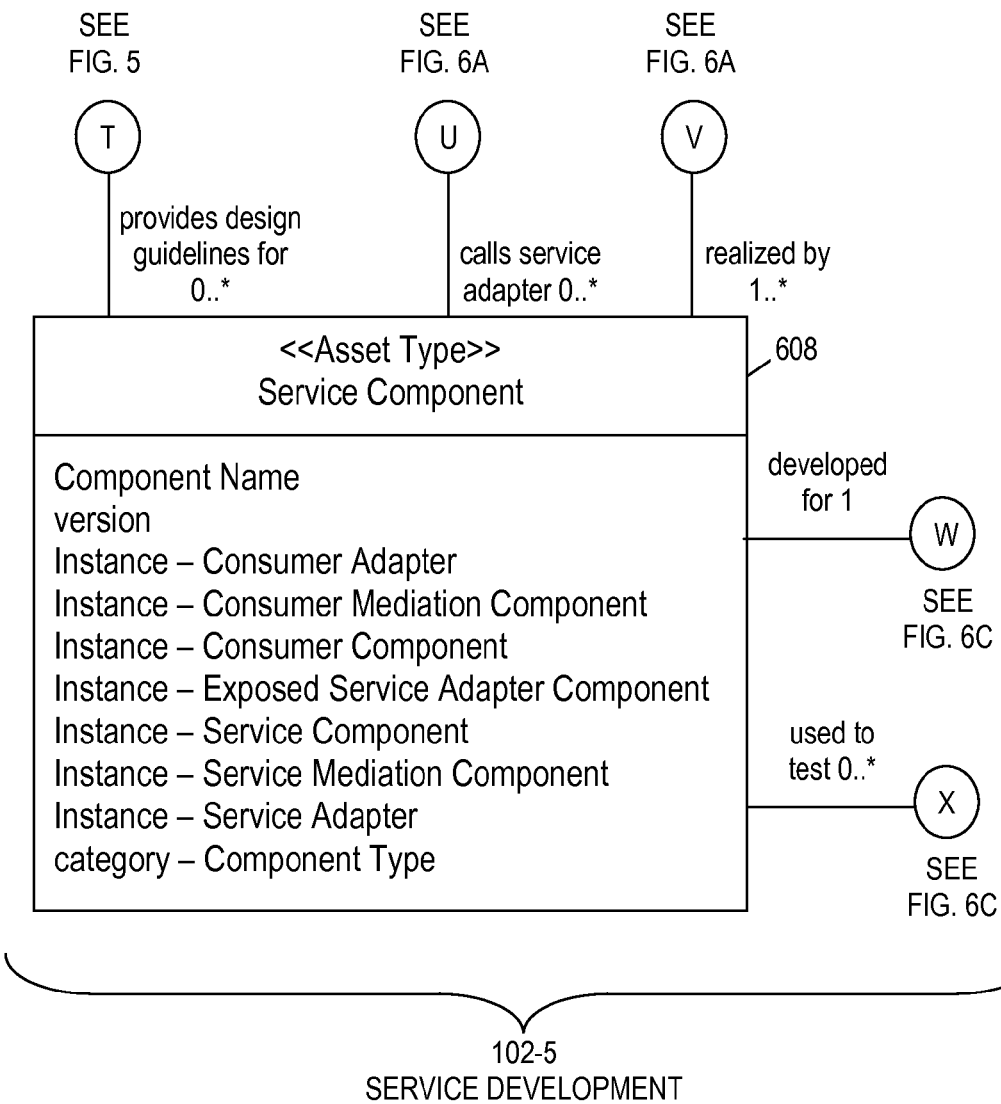
Figure 6C:
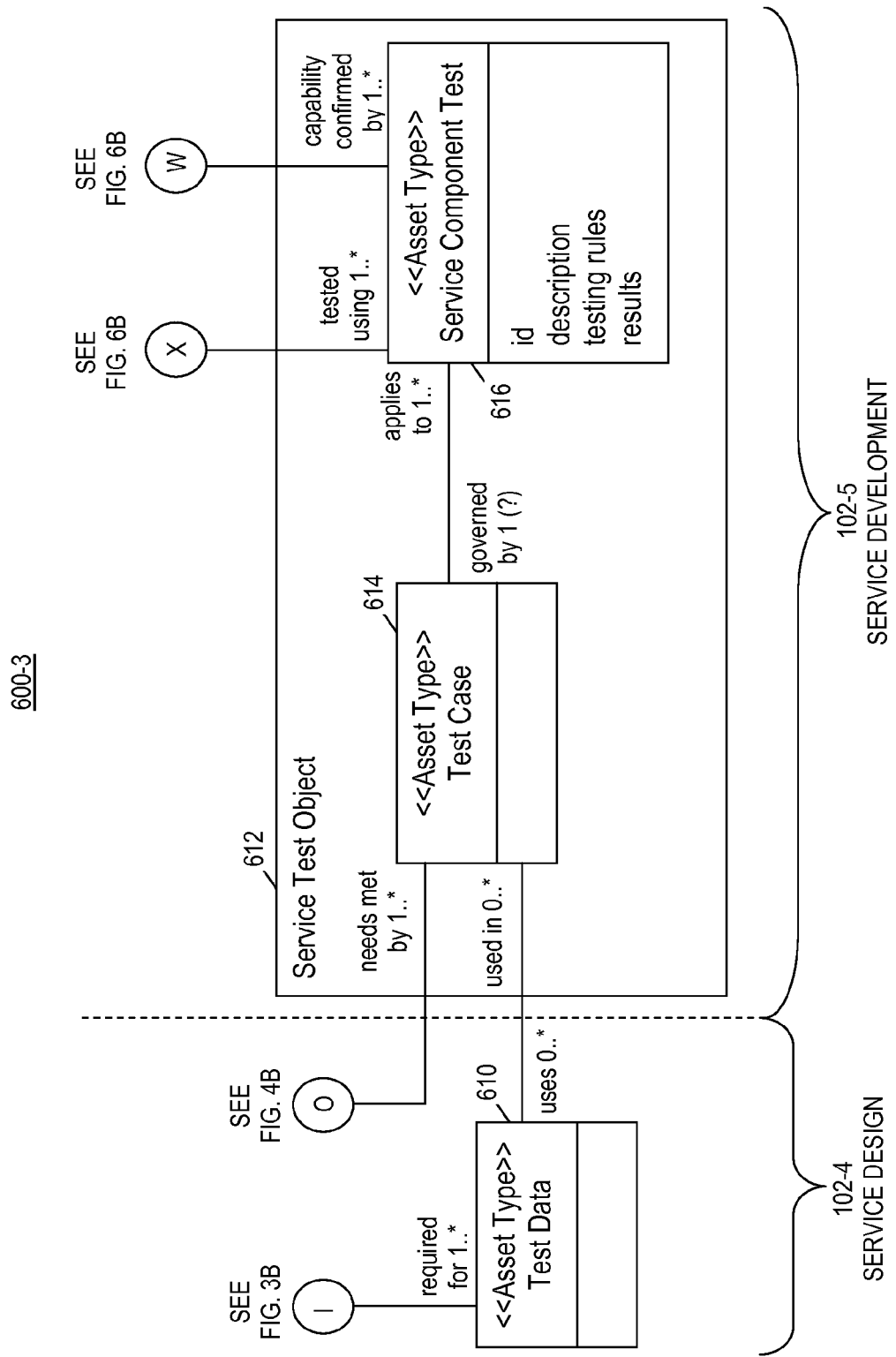

Components of the meta data model that are used during the requirements phase 102-1 are illustrated in FIG. 2. Components of the meta data model that are used during the business architecture phase 102-2 are illustrated in FIGS. 3A-3B. Components of the meta data model that are used during the business service architecture phase 102-3 are illustrated in FIGS. 4A-4B. Components of the meta data model that are used during the service design phase 102-4 are illustrated in FIG. 5 and FIG. 6C. Components of the meta data model that are used during the service development phase 102-5 are illustrated in FIGS. 6A-6C. Components of the meta data model that are used during the service implementation phase 102-6 are illustrated in FIG. 6A.

The portions of the meta data model shown in FIG. 2, FIGS. 3A-3B, FIGS. 4A-4B, FIG. 5, and FIGS. 6A-6C include boxes, where each box indicates an asset type or a category schema.

A box in the meta data model that indicates an asset type is divided into an upper portion and a lower portion. The upper portion of such a box designates the box as an asset type and includes the name of the asset type. The lower portion of the box includes zero or more attributes of the asset type indicated in the upper portion of the box.

Similarly, a box (i.e., category schema box) in the meta data model that indicates a category schema has an upper portion and a lower portion. The upper portion of a category schema box designates the box as a category schema and includes the name of the category schema. The lower portion of a category schema box includes one or more attributes of the category schema indicated in the upper portion of the category schema box.

The asset types shown in the meta data model are heterogeneous asset types defined according to the Definitions section presented above. The category schemas shown in the meta data model are heterogeneous category schemas defined according to the Definitions section presented above. The names of asset types, category schemas and attributes shown in the meta data model are examples and the present invention contemplates that other names may be used instead of the names shown in FIG. 2, FIGS. 3A-3B, FIGS. 4A-4B, FIG. 5, and FIGS. 6A-6C.

It should be noted that the multiplicity values included in the discussions of FIG. 2, FIGS. 3A-3B, FIGS. 4A-4B, FIG. 5, and FIGS. 6A-6C include: 0 . . . 1 (i.e., zero or one), 1 (i.e., one only), 0 . . . * (i.e., zero or more), and 1 . . . * (i.e., one or more).

FIG. 2 is a block diagram of a portion of a meta data model for managing work products and deliverables and providing traceability between business requirements and implemented services, where the portion represents work products in a requirements period of the systems development lifecycle of FIG. 1, in accordance with embodiments of the present invention. Portion 200 of the meta data model includes a requirement asset type 202, a functional requirement asset type 204, a non-functional requirement asset type 206, and a data requirement 208, which are utilized in the requirements phase 102-1 of systems development lifecycle 100 (see FIG. 1).

A requirement specified by requirement asset type 202 may be a functional requirement specified by asset type 204, a non-functional requirement specified by asset type 206, or a data requirement specified by asset type 208.

As indicated by label A, the meta data model includes a relationship between functional requirement asset type 204 and a process element asset type 308 (see FIG. 3B), where the relationship indicates that a functional requirement specified by asset type 204 is represented as a process element specified by the process element asset type 308 (see FIG. 3B) with a multiplicity value of 0 . . . *.

As indicated by label B, non-functional requirement asset type 206 is related to an entity asset type 310 (see FIG. 3B) in the meta data model so that a non-functional requirement specified by asset type 206 constrains an entity specified by entity asset type 310 (see FIG. 3B) with a multiplicity value of 0 . . . *.

As indicated by label C, the meta data model also includes a relationship between data requirement asset type 208 and entity asset type 310 (see FIG. 3B), where the relationship indicates that a data requirement specified by asset type 208 is represented as an entity specified by entity asset type 310 (see FIG. 3B) with a multiplicity value of 0 . . . *.

FIGS. 3A-3B is a block diagram of portions of a meta data model for managing work products and deliverables and providing traceability between business requirements and implemented services, where the portions represent work products in a business architecture period of the systems development lifecycle of FIG. 1, in accordance with embodiments of the present invention. In FIG. 3A, portion 300-1 of the meta data model includes a process asset type 302, a business process category schema 304, and a generic process category schema 306, which are utilized in the business architecture phase 102-2 of systems development lifecycle 100 (see FIG. 1).

A process specified by process asset type 302 may be categorized as a business process specified by category schema 304 or as a generic process specified by category schema 306.

As indicated by label D, the meta data model includes a relationship between process asset type 302 and process element asset type 308 (see FIG. 3B), where a process specified by process asset type 302 references a process element specified by process element asset type 308 (see FIG. 3B) with a multiplicity value of 0 . . . *.

Further, as indicated by label E, the meta data model includes a relationship between business process category schema 304 and a service interface asset type 604 (see FIG. 6A), where the relationship indicates that a business process specified by category schema 304 is fulfilled by a service interface specified by service interface asset type 604 (see FIG. 6A) with a multiplicity value of 0 . . . *.

Still further, as indicated by label F, the meta data model includes a relationship between generic process category schema 306 and a business service asset type 418 (see FIG. 4B), where the relationship indicates that a generic process specified by category schema 306 involves a business service specified by business service asset type 418 (see FIG. 4B) with a multiplicity value of 0 . . . *.

In FIG. 3B, portion 300-2 of the meta data model includes process element asset type 308 and entity asset type 310, which are utilized in the business architecture phase 102-2 of systems development lifecycle 100 (see FIG. 1).

The meta data model includes the relationship (see label D) between process element asset type 308 and process asset type 302 (see FIG. 3A), where the relationship indicates that a process element specified by asset type 308 is referenced in a process specified by the process asset type 302 (see FIG. 3A) with a multiplicity value of 0 . . . *.

The meta data model also includes the relationship (see label A) between process element asset type 308 and functional requirement asset type 204 (see FIG. 2), where the relationship indicates that a process element specified by asset type 308 represents in a functional requirement specified by functional requirement asset type 204 (see FIG. 2) with a multiplicity value of 0 . . . *.

Moreover, as indicated by label G, the meta data model includes a relationship between process element asset type 308 and business service asset type 418 (see FIG. 4B), where the relationship indicates that a process element specified by asset type 308 identifies a business service specified by business service asset type 418 (see FIG. 4B) with a multiplicity value of 0 . . . 1.

With respect to entity asset type 310, the meta data model includes relationships between the entity asset type and non-functional requirement asset type 206 (see FIG. 2), data requirement asset type 208 (see FIG. 2), business service asset type 418 (see FIG. 4B), and a test data asset type 610 (see FIG. 6C).

The relationship (see label B) between the entity asset type 310 and non-functional requirement asset type 206 (see FIG. 2) indicates that an entity specified by asset type 310 is constrained by a non-functional requirement specified by asset type 206 (see FIG. 2) with a multiplicity value of 0 . . . *.

Further, the relationship (see label C) between entity asset type 310 and data requirement asset type 208 (see FIG. 2) indicates that an entity specified asset type 310 represents a data requirement specified by asset type 208 (see FIG. 2) with a multiplicity value of 0 . . . *.

Still further, the relationship (see label H) between entity asset type 310 and business service asset type 418 (see FIG. 4B) indicates that an entity specified by asset type 310 describes data of a business service specified by asset type 418 (see FIG. 4B) with a multiplicity value of 0 . . . *.

Further yet, the relationship (see label I) between entity asset type 310 and test data asset type 610 (see FIG. 6C) indicates that an entity specified by asset type 310 is required for test data specified by asset type 610 (see FIG. 6C) with a multiplicity value of 1 . . . *.

FIGS. 4A-4B is a block diagram of portions of a meta data model for managing work products and deliverables and providing traceability between business requirements and implemented services, where the portions represent work products in a business service architecture period of the systems development lifecycle of FIG. 1, in accordance with embodiments of the present invention. In FIG. 4A, portion 400-1 of the meta data model includes a consumer category schema 402, a customer category schema 404, a supplier category schema 406, a provider category schema 408, an application category schema 410, a heritage category schema 412, a package category schema 414, and a legacy category schema 416, which are utilized in the business service architecture phase 102-3 of systems development lifecycle 100 (see FIG. 1).

A consumer specified by consumer category schema 402 is a generalization of a customer specified by category schema 404 and of a supplier specified by supplier category schema 406. As used herein, a generalization is defined as an inheritance relationship of a UML class diagram. That is, if type A is a generalization of type B, then any instance of type B is also an instance of type A and an instance of type B inherits the behavior and functionality of type A. The consumer is also a generalization of an application specified by application category schema 410. As indicated by label K, the consumer is a generalization of a business service specified by business service asset type 418 (see FIG. 4B).

A provider specified by provider category schema is a generalization of an application specified by application category schema 410. The provider is also a generalization of a supplier specified by category schema 406. As indicated by label L, the provider is a generalization of a business service specified by business service asset type 418 (see FIG. 4B).

An application specified by application category schema 410 is a generalization of a heritage specified by category schema 412, a package specified by category schema 414, and a legacy specified by category schema 416.

As indicated by label J, the meta data model includes a relationship between consumer category schema 402 and business service asset type 418 (see FIG. 4B), where the relationship indicates that a consumer specified by category schema 402 is a consumer of a business service specified by business service asset type 418 (see FIG. 4B) with a multiplicity value of 0 . . . *.

Further, as indicated by label M, the meta data model includes a relationship between provider category schema 408 and business service asset type 418 (see FIG. 4B), where the relationship indicates that a provider specified by the category schema 408 provides a business service specified by asset type 418 (see FIG. 4B) with a multiplicity value of 0 . . . *.

Still further, as indicated by label N, the meta data model includes a relationship between application category schema 410 and an API asset type 602 (see FIG. 6A), where the relationship indicates that an application specified by category schema 410 provides an API specified by asset type 602 (see FIG. 6A) with a multiplicity value of 0 . . . *.

In FIG. 4B, portion 400-2 of the meta data model includes business service asset type 418 and a standard asset type 420, which are utilized in the business service architecture phase 102-3 of systems development lifecycle 100 (see FIG. 1).

The meta data model includes a relationship between business service asset type 418 and standard asset type 420, where the relationship indicates that a business service specified by asset type 418 conforms to one or more standards specified by asset type 420 and a standard specified by asset type 420 is a design template for zero or more business services specified by asset type 418.

The relationship designated by label F indicates that a business service specified by asset type 418 is involved in a generic process specified by category schema 306 (see FIG. 3A) with a multiplicity value of 0 . . . *.

The relationship designated by label G indicates that a business service specified by asset type 418 is identified from a process element specified by asset type 308 (see FIG. 3B) with a multiplicity value of 1 . . . *.

The relationship designated by label H indicates that a business service specified by asset type 418 operates on data specified by asset type 310 (see FIG. 3B) with a multiplicity value of 1 . . . *.

The relationship designated by label J indicates that a business service specified by asset type 418 is consumed by a consumer specified by category schema 402 (see FIG. 4A) with a multiplicity value of 0 . . . *.

The relationship designated by label M indicates that a business service specified by asset type 418 is offered by a provider specified by category schema 408 (see FIG. 4A) with a multiplicity value of 0 . . . *.

As indicated by label O, the meta data model includes a relationship between business service asset type 418 and a test case asset type 614 (see FIG. 6C), where the relationship indicates that a business service specified by asset type 418 has needs met by a test case specified by asset type 614 (see FIG. 6C) with a multiplicity value of 1 . . . *.

As indicated by label P, the meta data model includes a relationship between business service asset type 418 and an IT service design asset type 504 (see FIG. 5), where the relationship indicates that a business service specified by asset type 418 is designed as an IT service design specified by asset type 504 (see FIG. 5) with a multiplicity value of 0 . . . *.

As indicated by label Q, the meta data model includes a relationship between business service asset type 418 and a human service design asset type 502 (see FIG. 5), where the relationship indicates that a business service specified by asset type 418 is designed as a human service design specified by asset type 502 (see FIG. 5) with a multiplicity value of 0 . . . *.

The meta data model includes a reflexive association that indicates that a first instance of a business service specified by asset type 418 is derived from zero or more other instances of the business service, and a second instance of the business service is a composite of one or more other instances of the business service.

As indicated by label R, the meta data model includes a relationship between standard asset type 420 and IT service design asset type 504 (see FIG. 5), where the relationship indicates that a standard specified by asset type 420 is a design template for an IT service design specified by asset type 504 (see FIG. 5) with a multiplicity value of 0 . . . *.

FIG. 5 is a block diagram of a portion of a meta data model for managing work products and deliverables and providing traceability between business requirements and implemented services, where the portion represents work products in a service design period of the systems development lifecycle of FIG. 1, in accordance with embodiments of the present invention. Portion 500 of the meta data model includes human service design asset type 502, IT service design asset type 504, peer-to-peer (P2P) service design category schema 506, and SOA service design category schema 508, which are utilized in the service design phase 102-4 of systems development lifecycle 100 (see FIG. 1).

An IT service design specified by asset type 504 may be categorized as a P2P service design specified by category schema 506 or as a SOA service design specified by category schema 508.

The relationship designated by label Q indicates that a human service design specified by asset type 502 is designed for only one business service specified by asset type 418 (see FIG. 4B).

The relationship designated by label P indicates that an IT service design specified by asset type 504 is designed for only one business service specified by asset type 418 (see FIG. 4B).

The relationship designated by label R indicates that an IT service design specified by asset type 504 conforms to a standard specified by asset type 420 (see FIG. 4B) with a multiplicity value of 1 . . . *.

As indicated by label S, the meta data model includes a relationship between IT service design asset type 504 and service interface asset type 604 (see FIG. 6A), where the relationship indicates that an IT service design specified by asset type 504 provides design guidelines for a service interface specified by asset type 604 (see FIG. 6A) with a multiplicity value of 0 . . . *.

As indicated by label T, the meta data model includes a relationship between IT service design asset type 504 and service component asset type 608 (see FIG. 6B), where the relationship indicates that an IT service design specified by asset type 504 provides design guidelines for a service component specified by asset type 608 (see FIG. 6B) with a multiplicity value of 0 . . . *.

FIGS. 6A-6C is a block diagram of portions of a meta data model for managing work products and deliverables and providing traceability between business requirements and implemented services, where the portions represent work products in a service design period, a service development period, and a service implementation period of the systems development lifecycle of FIG. 1, in accordance with embodiments of the present invention. In FIG. 6A, portion 600-1 of the meta data model includes API asset type 602, service interface asset type 604 and service implementation asset type 606. Asset types 602 and 604 are utilized in the service development phase 102-5 of systems development lifecycle 100 (see FIG. 1). Asset type 606 is utilized in the service implementation phase 102-6 of systems development lifecycle 100 (see FIG. 1).

The relationship designated by label N indicates that an API specified by asset type 602 is owned by only one application specified by category schema 410 (see FIG. 4A).

As indicated by label U, the meta data model includes a relationship between API asset type 602 and service component asset type 608 (see FIG. 6B), where the relationship indicates that an API specified by asset type 602 calls a service adapter attribute of a service component specified by asset type 608 (see FIG. 6B) with a multiplicity value of 0 . . . *.

The relationship designated by label S indicates that a service interface specified by asset type 604 conforms to only one IT service design specified by asset type 504 (see FIG. 5).

The relationship designated by label E indicates that a service interface specified by asset type 604 fulfills a business process specified by category schema 304 (see FIG. 3A) with a multiplicity value of 0 . . . *.

As indicated by label V, the meta data model includes a relationship between service interface asset type 604 and service component asset type 608 (see FIG. 6B), where the relationship indicates that a service interface specified by asset type 604 is realized by a service component specified by asset type 608 (see FIG. 6B) with a multiplicity value of 1 . . . *.

The meta data model also includes a relationship between service interface asset type 604 and service implementation asset type 606, where the relationship indicates that a service interface specified by asset type 604 specifies zero or more service implementations specified by asset type 606 and that a service implementation specified by asset type 606 is specified by only one service interface specified by asset type 604.

In FIG. 6B, portion 600-2 of the meta data model includes service component asset type 608, which is utilized in the service development phase 102-5 of systems development lifecycle 100 (see FIG. 1).

The relationship designated by label T indicates that a service component specified by asset type 608 conforms to only one IT service design specified by asset type 504 (see FIG. 5).

The relationship designated by label U indicates that an API specified by asset type 602 (see FIG. 6A) is called by only one service adapter attribute of a service component specified by asset type 608.

The relationship designated by label V indicates that a service component specified by asset type 608 realizes only one service interface specified by asset type 604 (see FIG. 6A).

As indicated by label W, the meta data model includes a relationship between service component asset type 608 and a service component test asset type 616 (see FIG. 6C), where the relationship indicates that a service component specified by asset type 608 is a capability confirmed by a service component test specified by asset type 616 (see FIG. 6C) with a multiplicity value of 1 . . . *.

As indicated by label X, the meta data model includes a relationship between service component asset type 608 and a service component test asset type 616 (see FIG. 6C), where the relationship indicates that a service component specified by asset type 608 is tested using a service component test specified by asset type 616 (see FIG. 6C) with a multiplicity value of 1 . . . *.

In FIG. 6C, portion 600-3 of the meta data model includes test data asset type 610 and a service test object 612. Test data asset type 610 is utilized in the service design phase 102-4 of systems development lifecycle 100 (see FIG. 1). Service test object 612 is utilized in the service development phase 102-5 of systems development lifecycle 100 (see FIG. 1). Service test object 612 includes test case asset type 614 and service component test asset type.

The relationship designated by label I indicates that test data specified by asset type 610 confirms data requirements of an entity specified by asset type 310 (see FIG. 3B) with a multiplicity value of 1 . . . *.

The relationship designated by label O indicates that a test case specified by asset type 614 confirms a capability of only one business service specified by asset type 418 (see FIG. 4B).

The relationship designated by label X indicates that a service component test specified by asset type 616 is used to test a service component specified by asset type 608 (see FIG. 6B) with a multiplicity value of 0 . . . *.

The relationship designated by label W indicates that a service component test specified by asset type 616 is developed for only one service component specified by asset type 608 (see FIG. 6B).

The meta data model includes a relationship between test data asset type 610 and test case asset type 614, where the relationship indicates that test data specified by asset type 610 is used in zero or more test cases specified by asset type 614 and that a test case specified by asset type 614 uses zero or more test data specified by asset type 610.

The meta data model also includes a relationship between test case asset type 614 and service component asset type 616, where the relationship indicates that a test case specified by asset type 614 applies to one or more service component tests specified by asset type 616 and that a service component test specified by asset type 616 is governed by only one test case specified by asset type 614.

An instance of the meta data model may be stored in a computer data storage device coupled to a computer system (e.g., in a relational database stored on a data storage device). The computer system receives user-provided selections (e.g., selections of hyperlinks) via a user interface such as graphical user interface (GUI) presented on a display unit coupled to the computer system. In response to receiving the selections, the computer system presents a series of displays for viewing by the user. The series of displays presents a series of relationships between assets used in a systems development lifecycle, where the series of relationships presents a tracing between a business requirement and an implemented service for viewing by the user.

In a first tracing between a business requirement and an implemented service, the computer system presents a series of displays based on user-provided selections, where a first display in the series includes details of a functional requirement, a second display in the series includes details of a process element related to the functional requirement, a third display in the series includes details of a business service related to the process element, a fourth display in the series includes details of an IT service design related to the business service, and a fifth display in the series includes details of a service component related to the IT service design.

The service component realizes a service interface represented by a service interface asset type, and the service interface specifies an implemented service associated with the service component. Thus, the first tracing shows a relationship between the functional requirement in the first display and the implemented service associated with the service component in the fifth display.

In the aforementioned first tracing, the computer system generates the first display after the computer system accesses a stored functional requirement specified by the functional requirement asset type 204 (see FIG. 2). The computer system generates the second display after the computer system accesses a stored process element specified by the process element asset type 308 (see FIG. 3B). The computer system generates the third display after the computer system accesses a stored business service specified by the business service asset type 418 (see FIG. 4B). The computer system generates the fourth display after the computer system accesses a stored IT service design specified by the IT service design asset type 504 (see FIG. 5). The computer system generates the fifth display after the computer system accesses a stored service component specified by the service component asset type 608 (see FIG. 6B).

The aforementioned actions of accessing the stored functional requirement, process element, business service, IT service design, and service component are performed in response to the computer system receiving user-provided selections of displayed hyperlinks.

In a second tracing between a business requirement and an implemented service, the computer system presents a series of displays based on user-provided selections, where a first display in the series includes details of a data requirement specified by asset type 208 (see FIG. 2), a second display in the series includes details of an entity specified by asset type 310 (see FIG. 3B), a third display in the series includes details of a business service specified by asset type 418 (see FIG. 4B), a fourth display in the series includes details of an IT service design specified by asset type 504 (see FIG. 5), and a fifth display in the series includes details of a service component specified by asset type 608 (see FIG. 6B).

The service component displayed in the second tracing realizes a service interface represented by a service interface asset type, and the service interface specifies an implemented service associated with the service component. Thus, the second tracing shows a relationship between the data requirement in the first display and the implemented service associated with the service component in the fifth display.

Similar to the first tracing, each display in the series of displays is generated by the computer system after accessing a corresponding stored item in a database, and the accessing is performed by the computer system in response to the computer system receiving user-provided selections of displayed hyperlinks.

Displays for Managing Work Products and Deliverables

FIGS. 7-11 and FIGS. 12A-12B illustrate how a collection of displays may be generated by a computer system in one embodiment, where the collection of displays includes information accessed from a stored instance of the meta data model. The collection of displays includes one or more series of displays that provide a traceability between a functional requirement and a service component.

FIG. 7 depicts a display of details of a functional requirement of an asset type included in the meta data model portion of FIG. 2, in accordance with embodiments of the present invention. Display 700 is generated and displayed by a computer system in response to user-provided selection of a hyperlink included in a user interface presented on a display device. Display 700 may be generated in response to the computer system receiving a user-provided activation of a hyperlink "Functional Requirements of Process P1" on display 800 (see FIG. 8). In the Related Assets section of display 700, "Process Element PE1" is a hyperlink for displaying details of the process element named PE1.

FIG. 8 depicts a display of details of a process element of an asset type included in the meta data model portion of FIG. 3B, in accordance with embodiments of the present invention. Display 800 may be generated and displayed by the computer system in response to receiving an activation of the hyperlink "Process Element PE1" included in display 700 (see FIG. 7) or display 900 (see FIG. 9). In the Related Assets section of display 800, "Business Service BS1" is a hyperlink for displaying details of a business service named BS1 and "Functional Requirements of Process P1" is a hyperlink for displaying the display 700 (see FIG. 7).

FIG. 9 depicts a display of details of a business service of an asset type included in the meta data model portion of FIG. 4B, in accordance with embodiments of the present invention. The computer system may generate and display the display 900 in response to receiving a user-provided activation of the hyperlink "Business Service BS1" included in display 800 (see FIG. 8), display 1000 (see FIG. 1) or display 1100 (see FIG. 11). In the Related Assets section of display 900, "Process Element PE1" is a hyperlink for displaying the display 800 (see FIG. 8), "Entity E1" is a hyperlink for displaying details of an entity named E1 (see FIG. 10), "IT Service Design SD1" is a hyperlink for displaying details of an IT service design named SD1 (see FIG. 11), "Standard S1" is a hyperlink for displaying details of a standard named S1 (not shown), and "Standard S2" is a hyperlink for displaying details of a standard named S2 (not shown).

FIG. 10 depicts a display of details of an entity of an asset type included in the meta data model portion of FIG. 3B, in accordance with embodiments of the present invention. The computer system may generate and display the display 1000 in response to receiving a user-provided activation of the hyperlink "Entity E1" included in display 900 (see FIG. 9). In the Related Assets section of display 1000, "Business Service BS1" is a hyperlink for displaying the display 900 (see FIG. 9).

FIG. 11 depicts a display of details of an IT service design of an asset type included in the meta data model portion of FIG. 5, in accordance with embodiments of the present invention. The computer system may generate and display the display 1100 in response to receiving a user-provided activation of the hyperlink "IT Service Design SD1" included in display 900 (see FIG. 9). In the Related Assets section of display 1100, "Business Service BS1" is a hyperlink for displaying the display 900 (see FIG. 9), "Service Component SC1" is a hyperlink for displaying details of a service component named SC1, and "Standard S3" is a hyperlink for displaying details of a standard named S3 (not shown).

FIG. 12A depicts a display of details of a service component of an asset type included in the meta data model portion of FIG. 6B, in accordance with embodiments of the present invention. The computer system generates and displays the display 1200 in response to receiving a user-provided activation of the hyperlink "Service Component SC1" included in display 1100 (see FIG. 11). In the Related Assets section of display 1200, "IT Service Design SD1" is a hyperlink for displaying the display 1100 (see FIG. 11).

FIG. 12B depicts a display of content that implements the service component of FIG. 12A, in accordance with embodiments of the present invention. The computer system generates display 1250 in response to receiving a user-provided activation of a hyperlink included in display 1200, but not shown in FIG. 12A. For example, display 1200 may include a hyperlink labeled "Content" for generating and displaying the display 1250. In the Work Product Instances section of display 1250, Asset 1, . . . Asset N are one or more hyperlinks for displaying content of one or more documents that are necessary to support and implement service component SC1. For example, in response to receiving a user-provided activation of the hyperlink "Asset 1," the computer system may display a document that consists of code of a software module identified by "Asset 1," where the module is used to implement service component SC1.

The traceability between functional requirement FR1 and service component SC1 is shown by the computer system performing the following actions: (1) receiving an activation of hyperlink "Process Element PE1" in display 700 (see FIG. 7); (2) in response to (1), generating and displaying display 800 (see FIG. 8); (3) receiving an activation of hyperlink "Business Service BS1" in display 800 (see FIG. 8); (4) in response to (3), generating and displaying display 900 (see FIG. 9); (5) receiving an activation of hyperlink "IT Service Design SD1" in display 900 (see FIG. 9); (6) in response to (5), generating and displaying display 1100 (see FIG. 11); (7)

receiving an activation of hyperlink "Service Component SC1" in display 1100 (see FIG. 11); and (8) in response to (7), generating and displaying display 1200 (see FIG. 12A).

Tracing Between Functional Requirements and Implemented Services

Figure 13A:
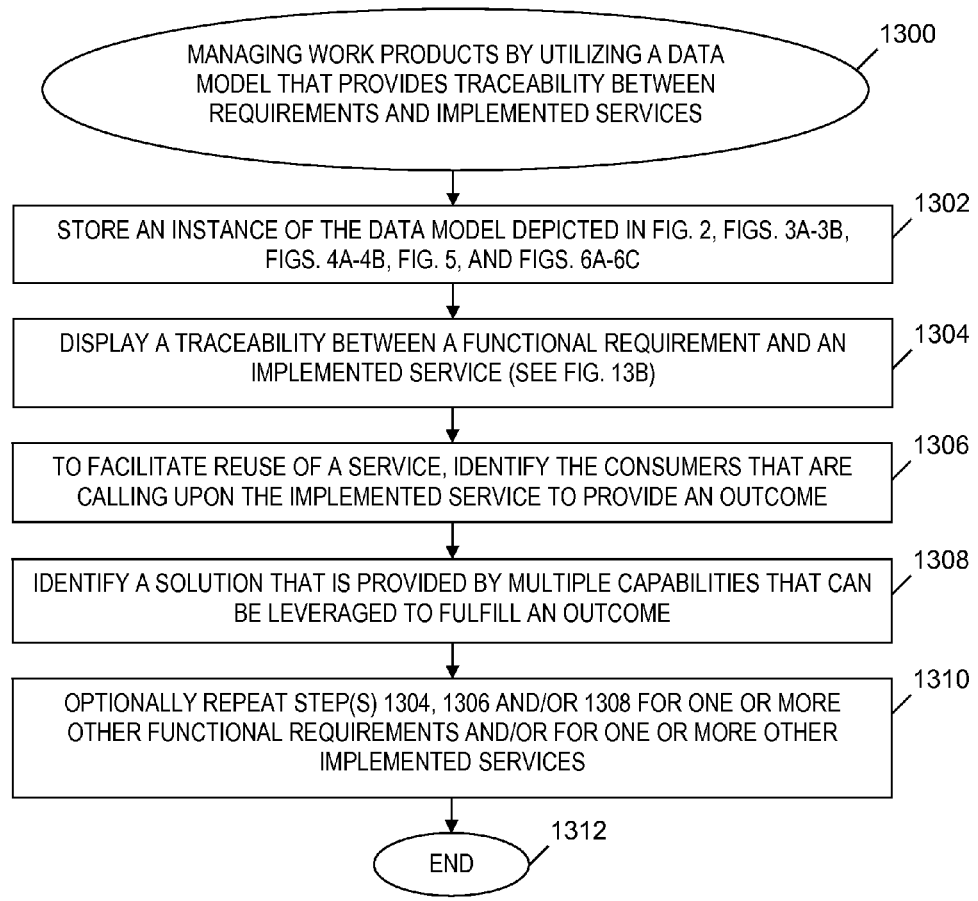
FIG. 13A is a flowchart of a process for managing work products by utilizing the meta data model whose portions are depicted in FIG. 2, FIGS. 3A-3B, FIGS. 4A-4B, FIG. 5, and FIGS. 6A-6B and by utilizing one or more of the displays included in FIGS. 7-11 and FIGS. 12A-12B, in accordance with embodiments of the present invention.

FIG. 13A is a flowchart of a process for managing work products by utilizing the meta data model whose portions are depicted in FIG. 2, FIGS. 3A-3B, FIGS. 4A-4B, FIG. 5, and FIGS. 6A-6B and by utilizing one or more of the displays included in FIGS. 7-11 and FIGS. 12A-12B, in accordance with embodiments of the present invention. The process for managing work products by utilizing the meta data model that provides traceability between requirements and services starts at step 1300. In step 1302, a computer system stores an instance of the meta data model in a computer data storage device.

In step 1304, the computer system displays a traceability between a functional requirement and an implemented service. The details of step 1304 are included in FIGS. 13B-13C.

In step 1306, the computer system identifies and displays multiple consumers that are calling upon the implemented service to provide an outcome. The identification of the multiple consumers in step 1306 facilitates the reuse of a service.

In step 1308, the computer system identifies and displays a solution that is provided by multiple capabilities that can be leveraged to fulfill an outcome.

The present invention contemplates versions of the process of FIG. 13A that include any combination and any order of steps 1304, 1306 and 1308.

In optional step 1310, step(s) 1304, 1306 and/or 1308 are repeated for one or more other functional requirements and/or one or more other implemented services. The process of FIG. 13A ends at step 1312.

Figure 13B:
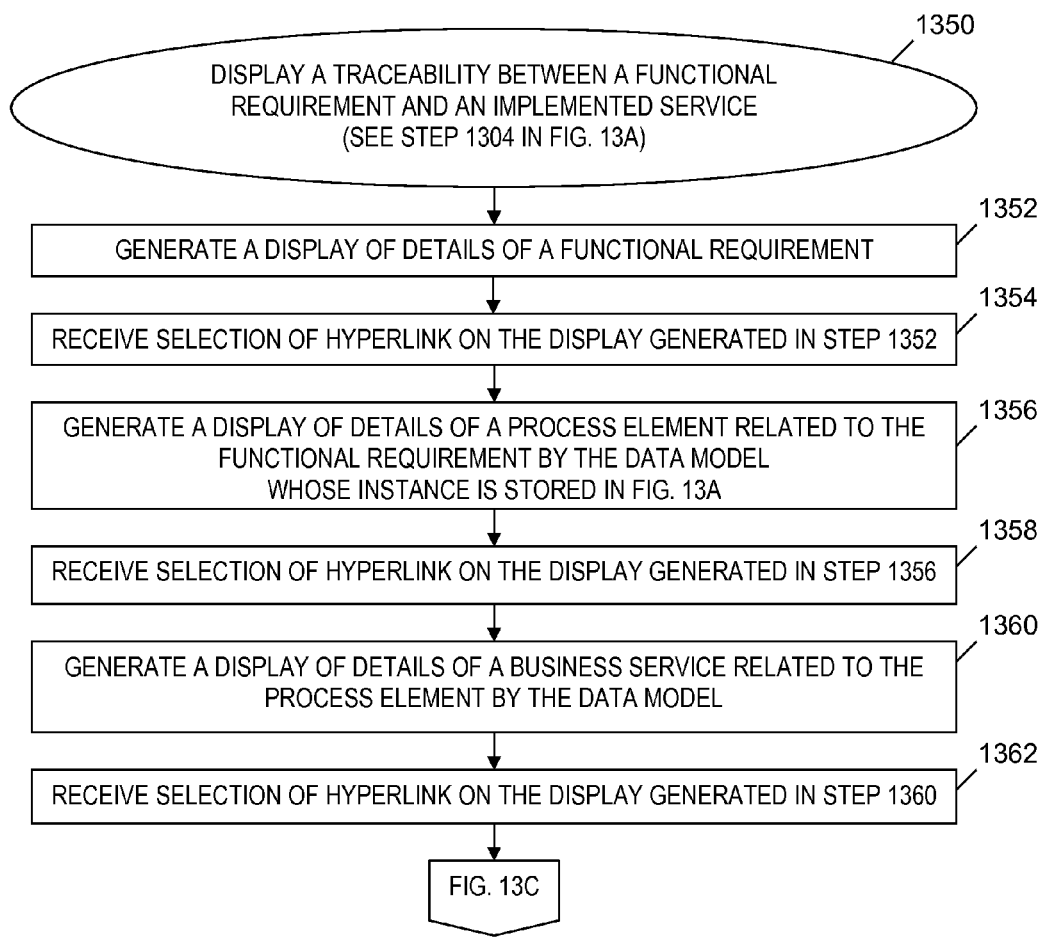
FIGS. 13B-13C depicts a flowchart of a process of displaying traceability between a functional requirement and an implemented service within the process of FIG. 13A, in accordance with embodiments of the present invention.
Figure 13C:
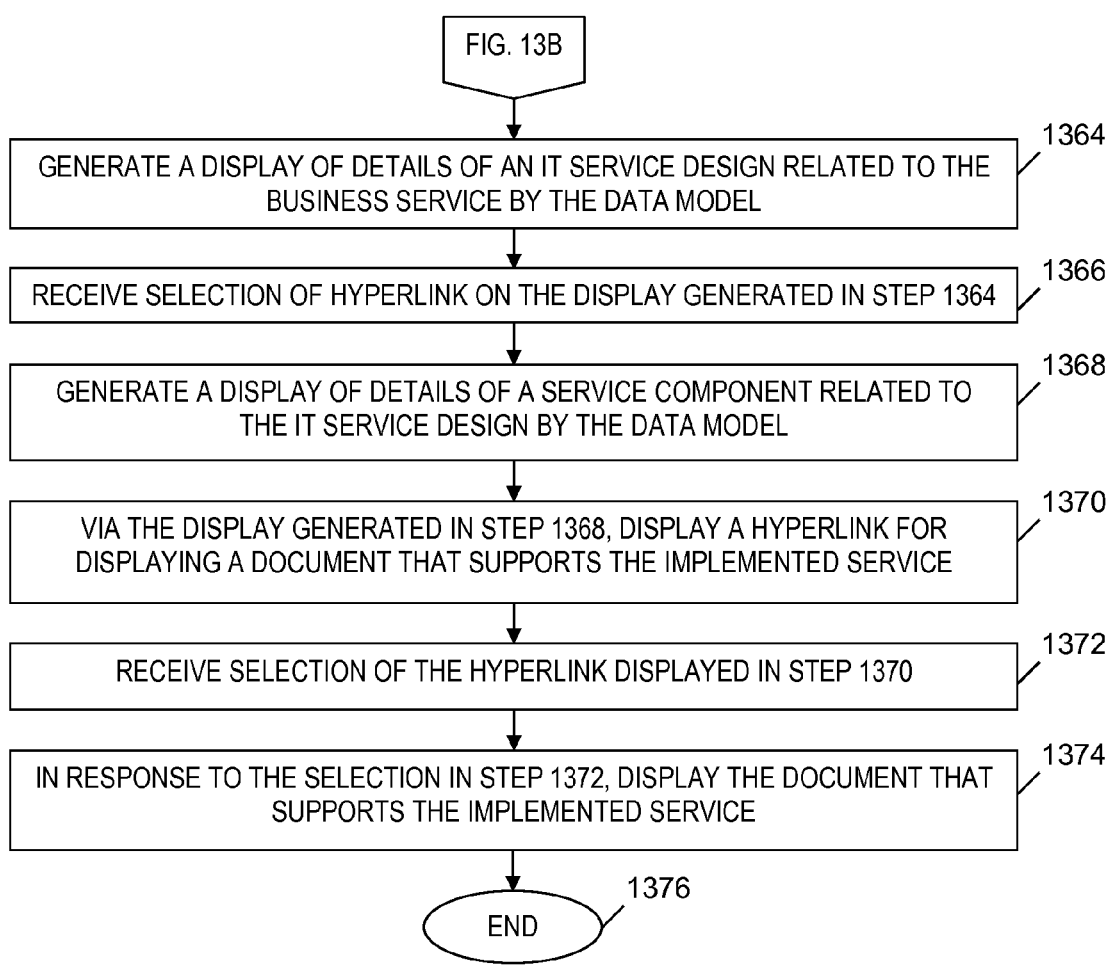

FIGS. 13B-13C depicts a flowchart of a process of displaying traceability between a functional requirement and an implemented service within the process of FIG. 13A, in accordance with embodiments of the present invention. The process of displaying a traceability between a functional requirement and an implemented service starts at step 1350. In step 1352, the computer system generates a display (e.g., display 700 in FIG. 7) of details of a functional requirement specified by asset type 204 (see FIG. 2).

In step 1354, the computer system receives a user-provided selection of a hyperlink (e.g., hyperlink "Process Element PE1" in FIG. 7) on the display generated in step 1352.

In step 1356, the computer system generates a display (e.g., display 800 in FIG. 8) of details of a process element related to the functional requirement by the meta data model whose instance is stored in step 1302 (see FIG. 13A). The process element is specified by asset type 308 (see FIG. 3B).

In step 1358, the computer system receives a user-provided selection of a hyperlink (e.g., hyperlink "Business Service BS1" in FIG. 8) on the display generated in step 1356.

In step 1360, the computer system generates a display (e.g., display 900 in FIG. 9) of details of a business service related to the process element by the meta data model whose instance is stored in step 1302 (see FIG. 13A).

In step 1362, the computer system receives a user-provided selection of a hyperlink (e.g., hyperlink "IT Service Design SD1" in FIG. 9) on the display generated in step 1360.

Step 1362 is followed by step 1364 in FIG. 13C. In step 1364, the computer system generates a display (e.g., display 1100 in FIG. 11) of details of an IT service design related to the business service by the meta data model whose instance is stored in step 1302 (see FIG. 13A).

In step 1366, the computer system receives a user-provided selection of a hyperlink (e.g., hyperlink "Service Component SC1" in FIG. 11) on the display generated in step 1364.

In step 1368, the computer system generates a display (e.g., display 1200 in FIG. 12A) of details of a service component related to the IT service design by the meta data model whose instance is stored in step 1302 (see FIG. 13A).

In step 1370, the computer system displays one or more hyperlinks for displaying one or more documents that support the implemented service. The one or more hyperlinks are associated with the one or more documents in a one-to-one correspondence. In one embodiment, the one or more hyperlinks include text that identifies the names of the one or more documents. The one or more hyperlinks may be displayed on the display generated in step 1368 or the one or more hyperlinks may be displayed on a different display resulting from selecting a hyperlink (e.g., a "Content" hyperlink) included in the display generated in step 1368.

In step 1372, the computer system receives a user-provided selection of a hyperlink displayed in step 1370.

In step 1374, in response to receiving the selection in step 1372, the computer system displays the document corresponding to the hyperlink whose selection is received in step 1372. The process of FIGS. 13B-13C ends at step 1376.

Computer System

Figure 14:
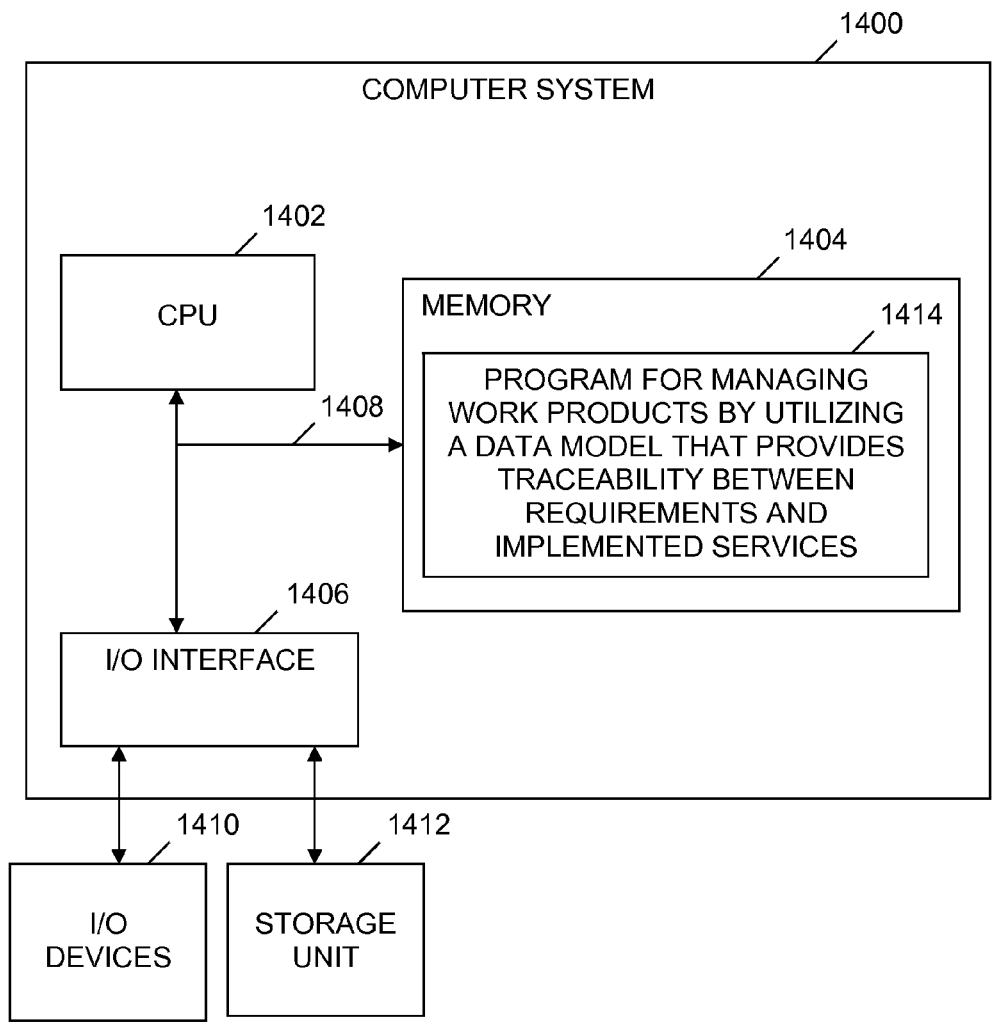
FIG. 14 is a block diagram of a computer system that implements the method of FIG. 13, in accordance with embodiments of the present invention.

FIG. 14 is a block diagram of a computer system that implements the method of FIG. 13 and utilizes the meta data model depicted in FIG. 2, FIGS. 3A-3B, FIGS. 4A-4B, FIG. 5, and FIGS. 6A-6C, in accordance with embodiments of the present invention. Computer system 1400 generally comprises a central processing unit (CPU) 1402, a memory 1404, an input/output (I/O) interface 1406, and a bus 1408. Further, computer system 1400 is coupled to I/O devices 1410 and a computer data storage unit 1412. CPU 1402 performs computation and control functions of computer system 1400. CPU 1402 may comprise a single processing unit, or be distributed across one or more processing units in one or more locations (e.g., on a client and server).

Memory 1404 may comprise any known computer readable storage medium, which is described below. In one embodiment, cache memory elements of memory 1404 provide temporary storage of at least some program code (e.g., program code 1414) in order to reduce the number of times code must be retrieved from bulk storage while instructions of the program code are carried out. Moreover, similar to CPU 1402, memory 1404 may reside at a single physical location, comprising one or more types of data storage, or be distributed across a plurality of physical systems in various forms. Further, memory 1404 can include data distributed across, for example, a local area network (LAN) or a wide area network (WAN).

I/O interface 1406 comprises any system for exchanging information to or from an external source. I/O devices 1410 comprise any known type of external device, including a display device (e.g., monitor for displaying the displays in FIGS. 7-11 and FIGS. 12A-12B), keyboard, mouse, printer, speakers, handheld device, facsimile, etc. Bus 1408 provides a communication link between each of the components in computer system 1400, and may comprise any type of transmission link, including electrical, optical, wireless, etc.

I/O interface 1406 also allows computer system 1400 to store and retrieve information (e.g., data or program instructions such as program code 1414) from an auxiliary storage device such as computer data storage unit 1412 or another computer data storage unit (not shown). Computer data storage unit 1412 may comprise any known computer readable storage medium, which is described below. For example, computer data storage unit 1412 may be a non-volatile data storage device, such as a magnetic disk drive (i.e., hard disk drive) or an optical disc drive (e.g., a CD-ROM drive which receives a CD-ROM disk).

Memory 1404 may include computer program code 1414 that provides the logic for managing work products by utilizing the meta data model that provides traceability between requirements and implemented services (e.g., the process of FIG. 13A). Further, memory 1404 may include other systems not shown in FIG. 14, such as an operating system (e.g., Linux) that runs on CPU 1402 and provides control of various components within and/or connected to computer system 1400.

Memory 1404, storage unit 1412, and/or one or more other computer data storage units (not shown) that are coupled to computer system 1400 may store a database that includes one or more instances of the meta data model.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., computer system 1400). Furthermore, an embodiment of the present invention may take the form of a computer program product embodied in one or more computer readable medium(s) (e.g., memory 1404 or computer data storage unit 1412) having computer readable program code (e.g., program code 1414) embodied or stored thereon.

Any combination of one or more computer readable medium(s) (e.g., memory 1404 and computer data storage unit 1412) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 1414) embodied on a computer readable medium may be transmitted using any appropriate medium, including but not limited to wireless, wireline, optical fiber cable, RF, etc., or any suitable combination of the foregoing.

Computer program code (e.g., program code 1414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server, where the aforementioned user's computer, remote computer and server may be, for example, computer system 1400 or another computer system (not shown) having components analogous to the components of computer system 1400 included in FIG. 14. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 13A-13C) and/or block diagrams of methods, apparatus (systems) (e.g., FIG. 14), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1414). These computer program instructions may be provided to a processor (e.g., CPU 1402) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium (e.g., memory 1404 or computer data storage unit 1412) that can direct a computer (e.g., computer system 1400), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 1400), other programmable data processing apparatus, or other devices to cause a series of operational steps to be performed on the computer, other programmable apparatus, or other devices to produce a computer implemented process such that the instructions which execute on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of managing work products by utilizing the meta data model that provides traceability between requirements and implemented services. Thus, an embodiment of the present invention discloses a process for supporting computer infrastructure, comprising integrating, hosting, maintaining and deploying computer-readable code (e.g., program code 1414) into a computer system (e.g., computer system 1400), wherein the code in combination with the computer system is capable of performing a process of managing work products by utilizing the meta data model that provides traceability between requirements and implemented services.

In another embodiment, the invention provides a business method that performs the process steps of the invention on a subscription, advertising and/or fee basis. That is, a service provider, such as a Solution Integrator, can offer to create, maintain, support, etc. a process of managing work products by utilizing the meta data model that provides traceability between requirements and implemented services. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 13A-13C and the block diagrams in FIGS. 2, 3A-3B, 4A-4B, 5, 6A-6C and 14 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer program product, comprising a computer-readable storage medium having a computer-readable program code stored therein, said computer-readable program code containing instructions executable by a processor of a computer system to implement a method of tracing a business requirement to an implemented service in a systems development lifecycle by processing data conforming to a data model, said data model comprising:
   a first asset type (functional requirement type) that represents a functional requirement;
   a second asset type (process element type) that represents a process element;
   a third asset type (business service type) that represents a business service;
   a fourth asset type (service design type) that represents an information technology (IT) service design;
   a fifth asset type (service component type) that represents a service component of said business service;
   a first relationship between said functional requirement type and said process element type, wherein said first relationship specifies that said functional requirement is represented as said process element;
   a second relationship between said process element type and said business service type, wherein said second relationship specifies that said process element identifies said business service;
   a third relationship between said business service type and said service design type, wherein said third relationship specifies that said business service is designed as said IT service design; and
   a fourth relationship between said service design type and said service component type, wherein said fourth relationship specifies that said service design provides design guidelines for said service component,
   wherein said functional requirement type, said process element type, said business service type, said service design type, said service component type, said first relationship, said second relationship, said third relationship, and said fourth relationship provides a tracing between said functional requirement and said implemented service, and
   wherein said first asset type, said second asset type, said third asset type, said fourth asset type, and said fifth asset type are heterogeneous asset types.

2. The program product of claim 1, wherein said service component realizes a service interface represented by a service interface type, and wherein said service interface specifies said implemented service represented by a service implementation type.

3. The program product of claim 1, wherein said data model further comprises:
   a sixth asset type (process type) that represents a process;
   a first category schema that represents a business process category that categorizes said process;
   a second category schema that represents a generic process category that categorizes said process;
   a fifth relationship between said process element type and said process type, wherein said fifth relationship specifies that said process element is referenced in said process;
   a sixth relationship between said first category schema and said service interface type, wherein said sixth relationship specifies that said business process category is fulfilled by said service interface; and
   a seventh relationship between said second category schema and said business service type, wherein said seventh relationship specifies that said generic process category involves said business service.

4. The program product of claim 1, wherein said data model further comprises:
   a sixth asset type (data requirement type) that represents a data requirement;
   a seventh asset type (entity type) that represents an entity;
   a fifth relationship between said data requirement type and said entity type, wherein said fifth relationship specifies that said data requirement is represented as said entity; and
   a sixth relationship between said entity type and said business service type, wherein said sixth relationship specifies that said entity describes data of said business service.

5. The program product of claim 4, wherein said data model further comprises:
  an eighth asset type (non-functional requirement type) that represents a non-functional requirement; and
  a seventh relationship between said non-functional requirement type and said entity type, wherein said seventh relationship specifies that said non-functional requirement constrains said entity.

6. The program product of claim 4, wherein said data model further comprises:
  an eighth asset type (service component test type) that represents a service component test;
  a ninth asset type (test case type) that represents a test case;
  a tenth asset type (test data type) that represents test data;
  a seventh relationship between said entity type and said test data type, wherein said seventh relationship specifies that said entity is required for said test data;
  an eighth relationship between said test data type and said test case type, wherein said eighth relationship specifies that said test data is used in said test case;
  a ninth relationship between said test case type and said service component test type, wherein said ninth relationship specifies that said test case applies to said service component test;
  a tenth relationship between said service component type and said service component test type, wherein said tenth relationship specifies that said service component is a capability configured for said service component test; and
  an eleventh relationship between said service component type and said service component test type, wherein said eleventh relationship specifies that said service component is tested using said service component test.

7. The program product of claim 1, wherein said data model further comprises:
  a sixth asset type (application programming interface (API) type) that represents an API;
  a first category schema that represents a consumer category that specifies a consumer;
  a second category schema that represents a customer category, wherein said customer category is a first category of said consumer category;
  a third category schema that represents a supplier category, wherein said supplier category is a second category of said consumer category;
  a fourth category schema that represents a provider category that specifies a provider, wherein said supplier category is a category of said provider category;
  a fifth category schema that represents an application category that specifies an application, wherein said application category is a third category of said consumer category, and wherein said application category is a category of said provider category;
  a sixth category schema that represents a heritage category, wherein said heritage category is a first category of said application category;
  a seventh category schema that represents a package category, wherein said package category is a second category of said application category;
  an eighth category schema that represents a legacy category, wherein said legacy category is a third category of said application category;
  a fifth relationship between said API type and said service component type, wherein said fifth relationship specifies that said API calls a service adapter of said service component;
  a sixth relationship between said fifth category schema and said API type, wherein said sixth relationship specifies that said application provides said API;
  a seventh relationship between said first category schema and said business service type, wherein said seventh relationship specifies that said consumer consumes said business service; and
  an eighth relationship between said fourth category schema and said business service type, wherein said eighth relationship specifies that said provider provides said business service.

8. The program product of claim 1, wherein said data model further comprises:
  a sixth asset type (human service design type) that represents a human service design; and
  a fifth relationship between said business service type and said human service design type, wherein said fifth relationship specifies that said business service is designed as said human service design.

9. The program product of claim 1, wherein said data model further comprises:
  a first category schema that represents a peer-to-peer (P2P) service design category; and
  a second category schema that represents a service-oriented architecture (SOA) category, wherein said P2P service design category categorizes said IT service design, and wherein said SOA category categorizes said IT service design.

10. A computer system comprising:
  a central processing unit (CPU);
  a memory coupled to the CPU; and
  a computer-readable, tangible storage device coupled to the CPU, the storage device containing instructions that when carried out by the CPU via the memory implement a method of tracing a business requirement to an implemented service in a systems development lifecycle by processing data conforming to a data model, said data model comprising:
  a first asset type (functional requirement type) that represents a functional requirement;
  a second asset type (process element type) that represents a process element;
  a third asset type (business service type) that represents a business service;
  a fourth asset type (service design type) that represents an information technology (IT) service design;
  a fifth asset type (service component type) that represents a service component of said business service;
  a first relationship between said functional requirement type and said process element type, wherein said first relationship specifies that said functional requirement is represented as said process element;
  a second relationship between said process element type and said business service type, wherein said second relationship specifies that said process element identifies said business service;
  a third relationship between said business service type and said service design type, wherein said third relationship specifies that said business service is designed as said IT service design; and
  a fourth relationship between said service design type and said service component type, wherein said fourth relationship specifies that said service design provides design guidelines for said service component,
  wherein said functional requirement type, said process element type, said business service type, said service design type, said service component type, said first relationship, said second relationship, said third relationship, and said fourth relationship provides a tracing between said functional requirement and said implemented service, and wherein said first asset type, said second asset type, said third asset type, said fourth asset type, and said fifth asset type are heterogeneous asset types.

11. The computer system of claim 10, wherein said service component realizes a service interface represented by a service interface type, and wherein said service interface specifies said implemented service represented by a service implementation type.

12. The computer system of claim 10, wherein said data model further comprises:
   a sixth asset type (process type) that represents a process;
   a first category schema that represents a business process category that categorizes said process;
   a second category schema that represents a generic process category that categorizes said process;
   a fifth relationship between said process element type and said process type, wherein said fifth relationship specifies that said process element is referenced in said process;
   a sixth relationship between said first category schema and said service interface type, wherein said sixth relationship specifies that said business process category is fulfilled by said service interface; and
   a seventh relationship between said second category schema and said business service type, wherein said seventh relationship specifies that said generic process category involves said business service.

13. The computer system of claim 10, wherein said data model further comprises:
   a sixth asset type (data requirement type) that represents a data requirement;
   a seventh asset type (entity type) that represents an entity;
   a fifth relationship between said data requirement type and said entity type, wherein said fifth relationship specifies that said data requirement is represented as said entity; and
   a sixth relationship between said entity type and said business service type, wherein said sixth relationship specifies that said entity describes data of said business service.

14. The computer system of claim 13, wherein said data model further comprises:
   an eighth asset type (non-functional requirement type) that represents a non-functional requirement; and
   a seventh relationship between said non-functional requirement type and said entity type, wherein said seventh relationship specifies that said non-functional requirement constrains said entity.

15. The computer system of claim 13, wherein said data model further comprises:
   an eighth asset type (service component test type) that represents a service component test;
   a ninth asset type (test case type) that represents a test case;
   a tenth asset type (test data type) that represents test data;
   a seventh relationship between said entity type and said test data type, wherein said seventh relationship specifies that said entity is required for said test data;
   an eighth relationship between said test data type and said test case type, wherein said eighth relationship specifies that said test data is used in said test case;
   a ninth relationship between said test case type and said service component test type, wherein said ninth relationship specifies that said test case applies to said service component test;
   a tenth relationship between said service component type and said service component test type, wherein said tenth relationship specifies that said service component is a capability configured for said service component test; and
   an eleventh relationship between said service component type and said service component test type, wherein said eleventh relationship specifies that said service component is tested using said service component test.

16. The computer system of claim 10, wherein said data model further comprises:
   a sixth asset type (application programming interface (API) type) that represents an API;
   a first category schema that represents a consumer category that specifies a consumer;
   a second category schema that represents a customer category, wherein said customer category is a first category of said consumer category;
   a third category schema that represents a supplier category, wherein said supplier category is a second category of said consumer category;
   a fourth category schema that represents a provider category that specifies a provider, wherein said supplier category is a category of said provider category;
   a fifth category schema that represents an application category that specifies an application, wherein said application category is a third category of said consumer category, and wherein said application category is a category of said provider category;
   a sixth category schema that represents a heritage category, wherein said heritage category is a first category of said application category;
   a seventh category schema that represents a package category, wherein said package category is a second category of said application category;
   an eighth category schema that represents a legacy category, wherein said legacy category is a third category of said application category;
   a fifth relationship between said API type and said service component type, wherein said fifth relationship specifies that said API calls a service adapter of said service component;
   a sixth relationship between said fifth category schema and said API type, wherein said sixth relationship specifies that said application provides said API;
   a seventh relationship between said first category schema and said business service type, wherein said seventh relationship specifies that said consumer consumes said business service; and
   an eighth relationship between said fourth category schema and said business service type, wherein said eighth relationship specifies that said provider provides said business service.

17. The computer system of claim 10, wherein said data model further comprises:
   a sixth asset type (human service design type) that represents a human service design; and
   a fifth relationship between said business service type and said human service design type, wherein said fifth relationship specifies that said business service is designed as said human service design.

18. The computer system of claim 10, wherein said data model further comprises:
- a first category schema that represents a peer-to-peer (P2P) service design category; and
- a second category schema that represents a service-oriented architecture (SOA) category, wherein said P2P service design category categorizes said IT service design, and wherein said SOA category categorizes said IT service design.

* * * * *